US009669565B2

(12) United States Patent
Osaka et al.

(10) Patent No.: US 9,669,565 B2
(45) Date of Patent: Jun. 6, 2017

(54) PARTICLES AND METHOD FOR PRODUCING PARTICLES

(71) Applicants: Keiko Osaka, Shizuoka (JP); Chiaki Tanaka, Shizuoka (JP)

(72) Inventors: Keiko Osaka, Shizuoka (JP); Chiaki Tanaka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 198 days.

(21) Appl. No.: 14/397,715

(22) PCT Filed: Apr. 30, 2013

(86) PCT No.: PCT/JP2013/062983
§ 371 (c)(1),
(2) Date: Oct. 29, 2014

(87) PCT Pub. No.: WO2013/165020
PCT Pub. Date: Nov. 7, 2013

(65) Prior Publication Data
US 2015/0119484 A1 Apr. 30, 2015

(30) Foreign Application Priority Data

May 2, 2012 (JP) .................. 2012-105030

(51) Int. Cl.
| *B29B 9/10* | (2006.01) |
| *C08G 18/32* | (2006.01) |
| *B01J 2/04* | (2006.01) |
| *C08G 18/34* | (2006.01) |
| *C08G 18/73* | (2006.01) |
| *C08G 63/16* | (2006.01) |
| *C08G 63/183* | (2006.01) |
| *B05B 7/04* | (2006.01) |
| *B05B 7/06* | (2006.01) |
| *B05B 7/26* | (2006.01) |
| *G03G 9/08* | (2006.01) |
| *B29K 67/00* | (2006.01) |
| *B29K 75/00* | (2006.01) |

(52) U.S. Cl.
CPC .... *B29B 9/10* (2013.01); *B01J 2/04* (2013.01); *C08G 18/3206* (2013.01); *C08G 18/341* (2013.01); *C08G 18/73* (2013.01); *C08G 63/16* (2013.01); *C08G 63/183* (2013.01); *B05B 7/0483* (2013.01); *B05B 7/068* (2013.01); *B05B 7/267* (2013.01); *B29K 2067/00* (2013.01); *B29K 2067/046* (2013.01); *B29K 2075/00* (2013.01); *G03G 9/0802* (2013.01)

(58) Field of Classification Search
CPC ......... B01J 2/04; B29B 9/10; C08G 18/3206; C08G 18/341; C08G 18/73; C08G 63/16; C08G 63/183; B05B 7/0483; B05B 7/068; B05B 7/267; B29K 2067/00; B29K 2067/046; B29K 2075/00; G03G 9/0802

See application file for complete search history.

(56) References Cited

U.S. PATENT DOCUMENTS

| 5,304,001 A | 4/1994 | Kuo et al. |
| 5,403,089 A | 4/1995 | Kuo et al. |
| 8,524,437 B2 | 9/2013 | Yamauchi et al. |
| 2002/0049298 A1 | 4/2002 | Pross et al. |
| 2005/0112492 A1 | 5/2005 | Makino et al. |
| 2008/0277490 A1 | 11/2008 | Kinoshita et al. |
| 2010/0055590 A1 | 3/2010 | Honda et al. |
| 2012/0322005 A1 | 12/2012 | Tanaka et al. |
| 2013/0011782 A1 | 1/2013 | Sano et al. |
| 2015/0132696 A1 | 5/2015 | Osaka et al. |

FOREIGN PATENT DOCUMENTS

| CN | 104412167 A | 3/2015 |
| EP | 0 321 607 A2 | 6/1989 |
| EP | 0 420 181 A2 | 4/1991 |
| EP | 2 845 055 | 3/2015 |
| JP | 2677685 | 7/1997 |
| JP | 2004-195307 A | 7/2004 |
| JP | 3577390 | 7/2004 |
| JP | 2005-258394 | 9/2005 |
| JP | 4113452 | 4/2008 |
| JP | 2008-304901 | 12/2008 |
| JP | 2009-036816 | 2/2009 |
| JP | 2011-206759 | 10/2011 |
| JP | 2012-110888 | 6/2012 |
| JP | 2013-188938 A | 9/2013 |
| KR | 10-1994-0011563 B1 | 12/1994 |
| KR | 10-0167755 B1 | 3/1999 |
| WO | WO 2011/115203 A1 | 9/2011 |
| WO | WO 2013/165022 A1 | 11/2013 |

OTHER PUBLICATIONS

International Search Report Issued Aug. 20, 2013 for counterpart International Patent Application No. PCT/JP2013/062983 filed Apr. 30, 2013.
Office Action issued on Dec. 8, 2015 in Korean Patent Application No. 10-2014-7033436 with English translation.
Combined Office Action and Search Report issued on Oct. 28, 2015 in Chinese Patent Application No. 201380035688.0 with English translation.
Extended European Search Report issued Apr. 29, 2015 in Patent Application No. 13784669.7.
U.S. Appl. No. 14/384,494, filed Sep. 11, 2014, Osaka, et al.
U.S. Appl. No. 14/384,494, filed Sep. 11, 2014, Inventor: Osaka, et al.

*Primary Examiner* — Irina S Zemel
(74) *Attorney, Agent, or Firm* — Oblon, McClelland, Maier & Neustadt, L.L.P.

(57) ABSTRACT

A method for producing particles, which contains: bringing a compressive fluid and a pressure plastic material into contact with each other to melt the pressure plastic material; and jetting a melt obtained by melting the pressure plastic material to form particles, wherein the jetting the melt is performed by a two-fluid nozzle or three-fluid nozzle.

10 Claims, 5 Drawing Sheets

PARTICLES AND METHOD FOR PRODUCING PARTICLES

TECHNICAL FIELD

The present invention relates to particles and a method for producing particles using a compressive fluid.

BACKGROUND ART

Conventionally, various products in the shape of particles are produced by processing resins depending on the properties thereof. For example, disclosed is a method for producing a toner as one example of particles, in which a composition including a resin and additive is melted and kneaded, followed by cooling, solidification, pulverization, and classification (see PTL 1). In the case where a toner is produced by the aforementioned method, however, fine powder generated by pulverization is mixed in the toner, and therefore basic properties of the toner, such as charging properties, fixing ability, and heat resistant storage stability, are impaired.

As for a method for producing a toner without pulverizing a resin or the like, disclosed is a method for emulsifying and dispersing a colorant resin solution (see PTL 2). In according to this method, a colorant resin solution containing a polyester-based resin, a colorant, and a water-insoluble organic solvent is emulsified and dispersed in water to form an O/W emulsion, followed by removing the organic solvent to color resin particles, which are then aggregated to produce toner particles. In the case where a toner is produced in this method, however, there is a problem that a large load is applied to the environment as the organic solvent is used.

As for a method for producing a toner without using an organic solvent, disclosed is a method using liquid carbon dioxide (see PTL 3). In accordance with this method, a resin melt of polyester and liquid carbon dioxide are mixed by a static mixer, and the obtain mixture is discharged from a nozzle provided at an edge of the static mixer into the atmosphere having the temperature of 20° C. under the atmospheric pressure, to expand the mixture due to the reduction in the pressure, to thereby produce a toner.

In case of granulation through a one-fluid nozzle, however, a particle size distribution becomes broad, as a melted resin and a compressive fluid, such as liquid carbon dioxide, are mixed and the mixture of low viscosity is jetted from the nozzle, and therefore there is a problem that it is difficult to produce a large quantity of particles having uniformly small diameters.

CITATION LIST

Patent Literature

PTL 1: Japanese Patent (JP-B) No. 2677685
PTL 2: Japanese Patent JP-B No. 3577390
PTL 3: JP-B No. 4113452

SUMMARY OF INVENTION

Technical Problem

The present invention aims to provide particles, and a method for producing particles, which can prevent clogging as a compressive fluid and a melt are mixed inside a nozzle to form fine particles, and can produce particles having small diameters with a narrow particle size distribution.

Solution to Problem

The method for producing particles of the present invention, which is means for solving the aforementioned problems, contains:

bringing a compressive fluid and a pressure plastic material into contact with each other to melt the pressure plastic material; and jetting a melt obtained by melting the pressure plastic material to form particles, wherein the jetting the melt is performed by a two-fluid nozzle or three-fluid nozzle.

Advantageous Effects of Invention

The present invention can prevent clogging, and can produce particles having small diameters with a narrow particle size distribution.

DESCRIPTION OF EMBODIMENTS (Particles and Method for Producing Particles)

The method for producing particles of the present invention contains a melting step, and a particle forming step, and may further contain other steps, if necessary.

The jetting of the melt in the particle forming step is performed by means of a two-fluid nozzle, or a three-fluid nozzle.

The particles of the present invention are produced by the method for producing particles of the present invention.

The method for producing particles, and particles according to the present invention will be more specifically explained hereinafter.

Since the embodiment described below is a preferable embodiment of the present invention, various technically preferable limitations are described. However, the scope of the present invention is not limited to these embodiments, unless there is a clear note for limiting the present invention in the explanations below.

In the method for producing particles of the present embodiment, the compressive fluid and the pressure plastic material are brought into contact with each other to melt the pressure plastic material, and the obtained melt is jetted by a two-fluid nozzle or a three-fluid nozzle to form particles. In accordance with the aforementioned embodiment, the compressive fluid and the melt were mixed inside the nozzle to form fine particles, and therefore clogging can be prevented. Accordingly, it is possible to produce particles having small diameters with a narrow particle size distribution.

Note that, in the present embodiment, "melt" or "melted" means the state where raw materials, such as a pressure plastic material, are plasticized and liquidized as well as swollen, by being in contact with the compressive fluid. In the present embodiment, moreover, the raw materials are materials from which particles are produced, and materials that will be constitutional component of resulting particles. Further, as for the particles of the present invention, preferred is a toner used for developing a latent electrostatic image in electrophotography.

First, raw materials, such as a pressure plastic material, used in the production method of the present embodiment will be explained.

<Pressure Plastic Material>

Figure 1:
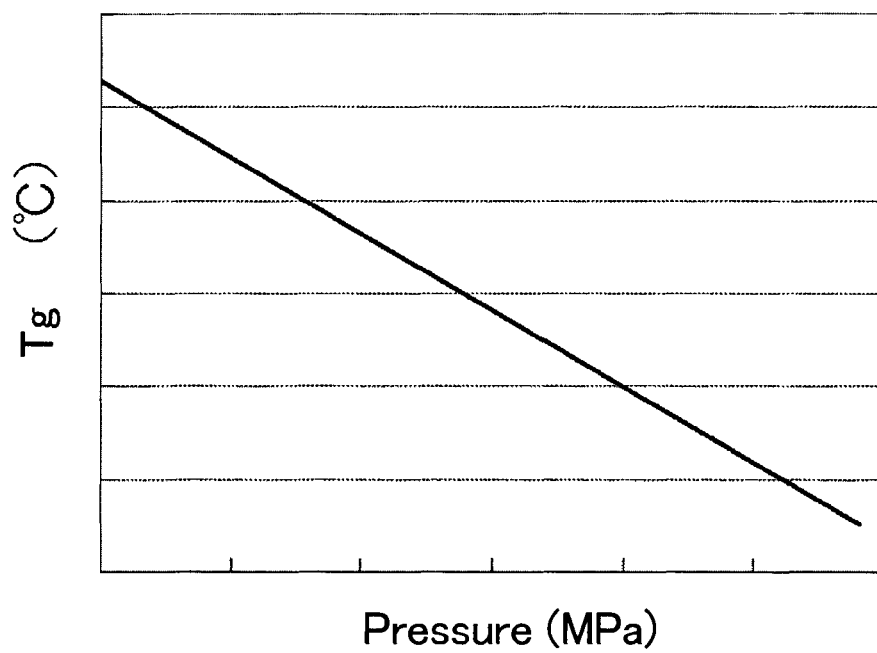
FIG. 1 is a graph illustrating a relation between glass transition temperature (vertical axis) of a pressure plastic material, and pressure (horizontal axis).

First, the pressure plastic material is explained with reference to FIG. 1. FIG. 1 is a graph depicting the relation between the glass transition temperature (vertical axis) of the pressure plastic material, and pressure (horizontal axis). In the present embodiment, the pressure plastic material is a material having a characteristic that the glass transition temperature (Tg) thereof reduces as pressure is applied. Specifically, the pressure plastic material is a material that is plasticized upon application of pressure without application of heat. For example, the pressure plastic material is plasticized at temperature lower than the glass transition temperature of the pressure plastic material as measured by atmospheric pressure, once pressure is applied to the pressure plastic material by bringing the pressure plastic material in contact with a compressive fluid.

FIG. 1 depicts the relation between grass transition temperature (vertical axis) of polystyrene, as an example of the pressure plastic material, and pressure (horizontal axis) in the presence of carbon dioxide. As illustrated in FIG. 1, there is a correlation between the glass transition temperature of the polystyrene and pressure, and the graph shows negative gradient. The material whose the gradient of the change in the grass transition temperature relative to pressure applied is negative, such as the case of polystyrene, is a pressure plastic material. The gradient varies depending on the type, composition, and molecular weight of the pressure plastic material.

For example, when the pressure plastic material is polystyrene, the gradient is −9° C./MPa; when the pressure plastic material is a styrene-acryl resin, the gradient is −9° C./MPa; when the pressure plastic material is a noncrystalline polyester resin, the gradient is −8° C./MPa; when the pressure plastic material is crystalline polyester, the gradient is −2° C./MPa; when the pressure plastic material is a polyol resin, the gradient is −8° C./MPa; when the pressure plastic material is a urethane resin, the gradient is −7° C./MPa; when the pressure plastic material is a polyacrylate resin, the gradient is −11° C./MPa; and when the pressure plastic resin is a polycarbonate resin, the gradient is −10° C./MPa.

Note that, the gradient can be determined based in the following manner. Specifically, grass transition temperature of the pressure plastic material is measured by means of high pressure calorimeter C-80, manufactured by SETARAM Instrumentation with varying pressure applied, and the gradient is determined based on the results from the measurement. In the measurement above, a sample is set in a high pressure measuring cell, the cell is then purged with carbon dioxide, followed by applying pressure to give the predetermined pressure to measure glass transition temperature of the sample. Moreover, the gradient can be determined based on the variation of the glass transition temperature when the pressure is changed from atmospheric pressure (0.1 MPa) to 10 MPa.

The gradient of the change in the glass transition temperature relative to the pressure is appropriately selected depending on the intended purpose without any limitation, but it is preferably −1° C./MPa or less, more preferably −5° C./MPa or less, and even more preferably −10° C./MPa or less. Note that, there is no lower limit for the gradient. When the gradient is greater than −1° C./MPa, plasticization is sufficient with application of pressure without applying heat, which cannot make the melt low viscous, and therefore it may be difficult to form particles.

The pressure plastic material is appropriately selected depending on the intended purpose without any limitation, and examples thereof include a polyester resin, a vinyl resin, a urethane resin, a polyamide resin, an epoxy resin, rosin, modified rosin, a terpene resin, a phenol resin, an aliphatic or alicyclic hydrocarbon resin, an aromatic petroleum resin, chlorinated paraffin, paraffin wax, polyethylene, and polypropylene. These may be used alone or in combination.

The polyester resin is appropriately selected depending on the intended purpose without any limitation, and examples thereof include modified polyester, unmodified polyester, non-crystalline polyester, crystalline polyester, and a polylactic acid resin.

The polylactic acid resin is appropriately selected depending on the intended purpose without any limitation, and examples thereof include an L-form, D-form, or racemic body polylactic acid resin, a polylactic acid resin of a stereo complex, and polylactic acid-based block copolymer.

The vinyl resin is appropriately selected depending on the intended purpose without any limitation, and examples thereof include: styrene and a polymer of a substituted product thereof, such as polystyrene, poly(p-chlorostyrene), and polyvinyl toluene; a styrene-based copolymer, such as a styrene-p-chlorostyrene copolymer, a styrene-propylene copolymer, a styrene-vinyltoluene copolymer, a styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-α-chloromethyl methacrylate copolymer, a styrene-acrylonitrile copolymer, a styrene-vinylmethylketone copolymer, a styrene-butadiene copolymer, a styrene-isoprene copolymer, a styrene-acrylonitrile-indene copolymer, a styrene-maleic acid copolymer, and a styrene-maleic acid ester copolymer; and a polymer of a monomer (e.g., polymethyl methacrylate, polybutyl methacrylate, polyvinyl chloride, polyvinyl acetate, vinyl propionate, (meth)acrylamide, vinyl methyl ether, vinyl ethyl ether, vinyl isobutyl ether, vinyl methyl ketone, N-vinyl pyrrolidone, N-vinyl pyridine, and butadiene), a copolymer including two or more of these monomers, or a mixture thereof.

The urethane resin is appropriately selected depending on the intended purpose without any limitation.

Among the examples of the pressure plastic material, a resin having at least a carbonyl structure —(C=O)— has excellent affinity to a compressive fluid, and exhibits a high plasticizing effect. Although specific principle has not yet been known, it is considered that reactivity thereof is high because of the following reason. In the carbonyl structure, oxygen having high electronegativity is bonded to carbon through π-bond, and the π-bond electron is strongly attracted to the oxygen, and thus the oxygen is negatively polarized, and the carbon is positively polarized. In the case where the compressive fluid is carbon dioxide, moreover, such resin and the carbon dioxide have high affinity as the carbonyl structure is similar to the structure of the carbon dioxide.

<Other Raw Materials>

In the production method of the present embodiment, other than the aforementioned pressure plastic material, other raw materials may be used in combination depending on properties or processability of particles to be produced. Assuming that particles to be produced in this embodiment are a toner, raw materials, such as a colorant, a surfactant, a dispersant, a releasing agent, a charge controlling agent, and crystalline polyester, will be explained hereinafter.

<<Colorant>>

The colorant is appropriately selected from known dyes and pigments depending on the intended purpose without any limitation. Examples of the pigment include carbon black, nigrosine dye, iron black, Naphthol Yellow S, Hansa Yellow (10G, 5G, G), cadmium yellow, yellow iron oxide, yellow ocher, chrome yellow, Titan Yellow, Polyazo Yellow, Oil Yellow, Hansa Yellow (GR, A, RN, R), Pigment Yellow L, Benzidine Yellow (G, GR), Permanent Yellow (NCG), Vulcan Fast Yellow (5G, R), Tartrazine Lake, Quinoline Yellow Lake, anthracene yellow BGL, isoindolinone yellow, colcothar, red lead oxide, lead red, cadmium red, cadmium mercury red, antimony red, Permanent Red 4R, Para Red, Fiser Red, parachloroorthonitroaniline red, Lithol Fast Scarlet G, Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanine blue, phthalocyanine blue, fast sky blue, indanthrene blue (RS, BC), indigo, ultramarine blue, iron blue, anthraquinone blue, fast violet B, methylviolet lake, cobalt purple, manganese violet, dioxane violet, anthraquinone violet, chrome green, zinc green, chromium oxide, viridian green, emerald green, pigment green B, naphthol green B, green gold, acid green lake, malachite green lake, phthalocyanine green, anthraquinone green, titanium oxide, zinc flower, and lithopone.

Examples of the dye include C.I. SOLVENT YELLOW (6, 9, 17, 31, 35, 100, 102, 103, 105), C.I. SOLVENT ORANGE (2, 7, 13, 14, 66), C.I. SOLVENT RED (5, 16, 17, 18, 19, 22, 23, 143, 145, 146, 149, 150, 151, 157, 158), C.I. SOLVENT VIOLET (31, 32, 33, 37), C.I. SOLVENT BLUE (22, 63, 78, 83 to 86, 191, 194, 195, 104), C.I. SOLVENT GREEN (24, 25), and C.I. SOLVENT BROWN (3, 9). Moreover, examples of a commercial product of the dye include: Aizen SOT dyes such as Yellow-1, 3, 4, Orange-1, 2, 3, Scarlet-1, Red-1, 2, 3, Brown-2, Blue-1, 2, Violet-1, Green-1, 2, 3, and Black-1, 4, 6, 8 (manufactured by Hodogaya Chemical Co., Ltd.); Sudan dyes such as Yellow-146, 150, Orange-220, Red-290, 380, 460, and Blue-670 (manufactured by BASF); Diaresin Yellow-3G, F, H2G, HG, HC, HL, Diaresin Orange-HS, G, Diaresin Red-GG, S, HS, A, K, H5B, Diaresin Violet-D, Diaresin Blue-J, G, N, K, P, H3G, 4G, Diaresin Green-C, and Diaresin Brown-A (manufactured by Mitsubishi Chemical Industries. Ltd.); Oil Color Yellow-3G, GG-S, #105, Oil Color Orange-PS, PR, #201, Oil Color Scarlet-#308, Oil Color Red-5B, Oil Color Brown-GR, #416, Oil Color Green-BG, #502, Oil Color Blue-BOS, IIN, and Oil Color Black-HBB, #803, EB, EX (manufactured by Orient Chemical Industries, Ltd.); Sumiplast Blue-GP, OR, Sumiplast Red-FB, 3B, and Sumiplast Yellow FL7G, GC (manufactured by Sumitomo Chemical Co., Ltd.); and Kayaron Polyester Black EX-SF300, Kayaset Red-B, and Kayaset Blue-A-2R (manufactured by Nippon Kayaku Co., Ltd).

The colorant may be used alone, or in combination.

An amount of the colorant is appropriately selected depending on a coloring degree without any limitation, but the amount thereof is preferably 1 part by mass to 50 parts by mass relative to 100 parts by mass of the pressure plastic material.

<<Surfactant>>

In the case where particles produced by the production method of the present embodiment are a toner, raw materials of the toner preferably include a surfactant. The surfactant is appropriately selected depending on the intended purpose without any limitation, provided that it contains, in a molecular thereof, a site having affinity to the compressive fluid, and a site having affinity to the toner.

In the case where a first compressive fluid, which will be explained later, is carbon dioxide, examples of the surfactant include a fluorosurfactant, a silicone surfactant, or a compound including a group having an affinity to carbon dioxide, such as a compound having a bulky functional group (e.g., a carbonyl group, a short-chain hydrocarbon group, and a propylene oxide group). These surfactants may be oligomers or polymers.

As for the fluorosurfactant, a compound having a C1-C30 perfluoroalkyl group is preferably used. Among them, a high molecular weight fluorosurfactant is preferable, as it has excellent surface activating properties, and excellent charging ability and durability as contained in a toner. Here, examples of structural units of the fluorosurfactant are represented by the following formulae (1-1) and (1-2).

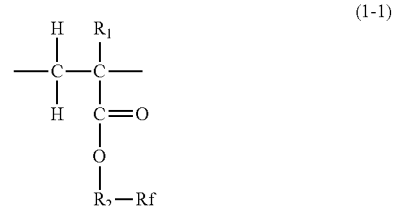

(1-1)

(1-2)

In the formulae (1-1) and (1-2), $R_1$ is a hydrogen atom or a C1-C4 lower alkyl group (e.g., a methyl group, an ethyl group, a propyl group, an isopropyl group, a n-butyl group, a sec-butyl group, and a tert-butyl group). In the formula (1-1), $R_2$ is an alkylene group (e.g., a methylene group, an ethylene group, a propylene group, an isoprene group, a 2-hydroxypropylene group, a butylene group, and a 2-hydroxybutylene group).

In the formulae (1-1) and (1-2), Rf is a C1-C30 perfluoroalkyl group or perfluoroalkenyl group. Among them, the preferable embodiment is a fluorosurfactant where $R_1$ is a hydrogen atom or a methyl group, $R_2$ is a methylene group or an ethylene group, and Rf is a C7-C10 perfluoroalkyl group.

Note that, a plurality of each structural unit of the formulae (1-1) and (1-2) are bonded to each other to form an oligomer or polymer. In view of an affinity to particles (a toner), a homopolymer, a block copolymer or a random copolymer may be formed. Each terminal of the oligomers or polymer is appropriately selected depending on the intended purpose without any limitation, but it is a hydrogen atom.

The silicone surfactant is not particularly limited, as long as it is a compound having a siloxane bond, and it may be a low molecular weight compound or a high molecular weight compound. Among them, preferred is a compound having a polydimethylsiloxane (PDMS) group represented by the following general formula (2). Note that, the silicone surfactant may be a homopolymer compound, a block copolymer compound, or a random copolymer compound, in view of an affinity to a toner.

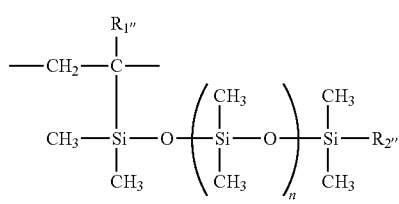
(2)

In the general formula (2), $R_1''$ is a hydrogen atom, or a C1-C4 lower alkyl group; n represents a number for repeating; and $R_2''$ is a hydrogen atom, a hydroxyl group, or a C1-C10 alkyl group.

The carbonyl group-containing compound is appropriately selected depending on the intended purpose without any limitation, and examples thereof include aliphatic polyester, polyacrylate, and an acrylic acid resin.

The PEG-containing compound is appropriately selected depending on the intended purpose without any limitation, and examples thereof include a PEG group-containing polyacrylate, and polyethylene glycol resin.

These surfactants may be obtained through polymerization of a vinyl monomer (e.g., an Rf group-containing vinyl monomer, a PDMS group-containing vinyl monomer, a PEG group-containing vinyl monomer) or through copolymerization of any of these vinyl monomers with another vinyl monomer. Examples of the vinyl monomer include a styrene monomer, an acrylate monomer, and a methacrylate monomer. These vinyl monomers are commercially readily available, and the vinyl monomer is appropriately selected from these commercial products depending on the intended purpose. Moreover, as the surfactant, a compound in which a Rf group, PDMS group, or PEG group forms a main chain of an oligomers or polymer, and a COOH group, OH group, amino group, or pyrrolidone skeleton is introduced into a side chain thereof may be used.

The fluorine group-containing surfactant is synthesized by polymerizing a fluorine-based vinyl monomer in a fluorine-based solvent, such as HCFC225. Moreover, in order to reduce an environmental load, the fluorine group-containing surfactant may be synthesized by polymerizing a fluorine-based vinyl monomer using supercritical carbon dioxide as a solvent, instead of HCFC225. Note that, various raw materials having a structure similar to a compound having a perfluoroalkyl group are commercially available (see a catalog of AZmax Corporation), and various surfactants can be obtained using these commercial products. Specifically, a method described in "Handbook of fluororesin" (edited by Takaomi Satokawa, published by Nikkan Kogyo Shimbun Ltd.) pp. 730 to 732, may be used.

Moreover, the silicone surfactant can be obtained through polymerization of a vinyl polymerizable monomer, which is a raw material of the surfactant. In this case, a supercritical fluid (preferably supercritical carbon dioxide) may be used as a solvent. Moreover, various compounds each having the structure similar to polydimethylsiloxane are commercially available (for example, see a catalog of AZmax Corporation), and the silicone surfactant may be obtained using any of these commercial products. Especially, a silicon-containing compound (product name: MONASIL-PCA, manufactured by Croda Japan K.K.) exhibits excellent properties for forming particles.

An amount of the surfactant in the raw materials of the toner is appropriately selected depending on the intended purpose without any limitation, but it is preferably 0.01% by mass to 30% by mass, more preferably 0.1% by mass to 20% by mass.

<<Dispersant>>

The dispersant is appropriately selected depending on the intended purpose without any limitation, and examples thereof include organic particles, and inorganic particles. Among them, preferred are acryl-modified inorganic particles, silicone-modified inorganic particles, fluorine-modified inorganic particles, fluorine-containing organic particles, and silicone organic particles. Particularly preferred are acryl-modified inorganic particles. The dispersant is preferably selected from those dissolved in the compressive fluid.

Examples of the organic particles include a silicone-modified product of acrylic particles that are insoluble in a supercritical fluid, and a fluorine-modified product of acrylic particles that are insoluble in a supercritical fluid.

Examples of the inorganic particles include: polyvalent metal phosphate, such as calcium phosphate, magnesium phosphate, aluminum phosphate, and zinc phosphate; carbonate, such as calcium carbonate, and magnesium carbonate; inorganic salt such as calcium metasilicate, calcium sulfate, barium sulfate; and inorganic oxide such as calcium hydroxide, magnesium hydroxide, aluminum hydroxide, silica, titanium oxide, bentonite, and alumina. Among them, silica is preferable.

Examples of the acryl-modified inorganic particles include inorganic particles in which a residual OH group present on a surface of each inorganic particle is modified with a silane coupling agent containing a fluorine atom. The reaction formula below illustrates an example of silica which is subjected to surface modification using 3-(trimethoxysil)propyl methacrylate.

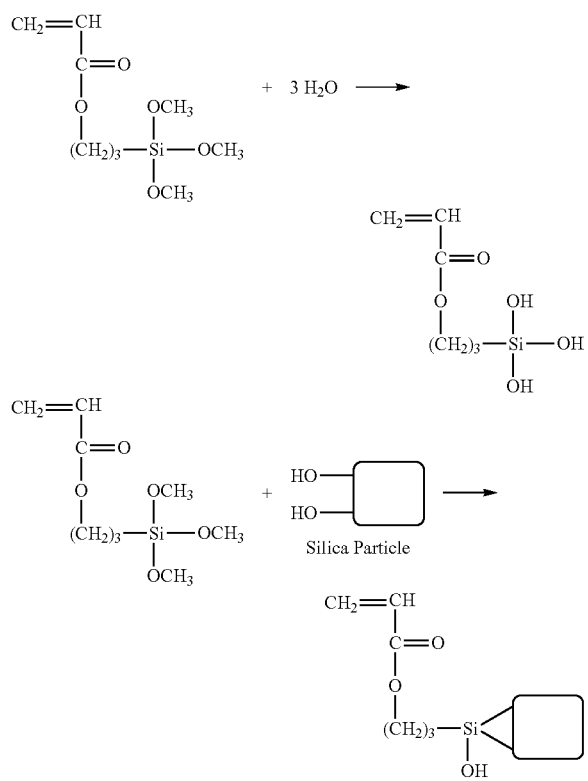

The acryl-modified silica obtained by the above-described method has a high affinity to supercritical carbon dioxide with its Si portion, and a high affinity to a toner with its acrylate portion. Note that, silica may be subjected to a surface modification in other methods, without using the reaction formula above, provided that the purpose is the same. Specific examples of the silane coupling agent containing a fluorine atom are listed below:

$CF_3(CH_2)_2SiCl_3$ (4-1)

$CF_3(CF_2)_5SiCl_3$ (4-2)

$CF_3(CF_2)_5(CH_2)_2SiCl_3$ (4-3)

$CF_3(CF_2)_7(CH_2)_2SiCl_3$ (4-4)

$CF_3(CF_2)_7CH_2CH_2Si(OCH_3)_3$ (4-5)

$CF_3(CF_2)_7(CH_2)_2Si(CH_3)Cl_2$ (4-6)

$CF_3(CH_2)_2Si(OCH_3)_3$ (4-7)

$CF_3(CH_2)_2Si(CH_3)(OCH_3)_2$ (4-8)

$CF_3(CF_2)_3(CH_2)_2Si(OCH_3)_3$ (4-9)

$CF_3(CF_2)_5CONH(CH_2)_2Si(OC_2H_5)_3$ (4-10)

$CF_3(CF_2)_4COO(CH_2)_2Si(OCH_3)_3$ (4-11)

$CF_3(CF_2)_7(CH_2)_2Si(OCH_3)_3$ (4-12)

$CF_3(CF_2)_7(CH_2)_2Si(CH_3)(OCH_3)_2$ (4-13)

$CF_3(CF_2)_7SO_2NH(CH_2)_3Si(OC_2H_5)_3$ (4-14)

$CF_3(CF_2)_8(CH_2)_2Si(OCH_3)_3$ (4-15)

An amount of the dispersant in the raw materials of a toner is appropriately selected depending on the intended purpose without any limitation, but it is preferably 0.1% by mass to 30% by mass, more preferably 0.2% by mass to 20% by mass. Moreover, the dispersant is preferably used alone, but may be used in combination with another surfactant in view of control of toner particle size, or charging properties of a toner.

<<Releasing Agent>>

The releasing agent is appropriately selected from known releasing agents depending on the intended purpose without any limitation, and preferable examples thereof include wax.

Examples of the wax include low molecular weight polyolefin wax, synthesized hydrocarbon wax, natural wax, petroleum wax, higher fatty acid and metal salt thereof, higher fatty acid amide, and various modified wax thereof. These may be used alone or in combination.

Examples of the low molecular weight polyolefin wax include low-molecular weight polyethylene wax and low-molecular weight polypropylene wax. Examples of the synthesized hydrocarbon wax include Fischer-Tropsh wax. Examples of the natural wax include bee wax, carnauba wax candelilla wax rice wax and montan waxes. Examples of the petroleum wax include paraffin wax and microcrystalline waxes. Examples of the high fatty acid include stearic acid, palmitic acid, and myristic acid.

A melting point of the releasing agent is appropriately selected depending on the intended purpose without any limitation, but it is preferably 40° C. to 160° C., more preferably 50° C. to 120° C., and even more preferably 60° C. to 90° C. When the melting point of the releasing agent is lower than 40° C., the wax may adversely affect heat resistant storage stability of a toner. When the melting point of the releasing agent is higher than 160° C., it is likely that cold offset may occur during a low-temperature fixing process, and a paper sheet may wind itself around the fixing device. Note that, the cold offset is a phenomenon that part of a toner image is removed by electrostatic force in a thermal fixing system, as the toner is not sufficiently melted at an interface with a sheet. It is also called as low temperature offset.

An amount of the releasing agent is appropriately selected depending on the intended purpose without any limitation, but it is preferably 1 part by mass to 20 parts by mass, more preferably 3 parts by mass to 15 parts by mass, relative to 100 parts by mass of the pressure plastic material. When the amount of the releasing agent is smaller than 1 part by mass, an effect of the releasing agent may not be exhibited sufficiently. When the amount thereof is greater than 20 parts by mass, heat resistant storage stability of a toner may be impaired.

<<Charge Controlling Agent>>

The charge controlling agent is appropriately selected from known charge controlling agents depending on the intended purpose without any limitation, but it is preferably a colorless material or a material having a color close to white, because a colored material may adversely affect the intended color tone of a toner. Examples of the charge controlling agent include nigrosine dye, triphenylmethane dye, chrome-containing metal complex dye, molybdic acid chelate pigment, rhodamine dye, alkoxy amine, quaternary ammonium salt (including fluoride-modified quaternary ammonium salt), alkylamide, phosphorus or compound thereof, tungsten or compound thereof, fluorine-containing surfactant, metal salt of salicylic acid, and metal salt of a salicylic acid derivative. Among them, preferred are metal salt of salicylic acid and metal salt of a salicylic acid derivative. These may be used alone or in combination. The metal used for the metal salt is appropriately selected depending on the intended purpose without any limitation, and examples thereof include aluminum, zinc, titanium, strontium, boron, silicon, nickel, iron, chrome, and zirconium.

Examples of a commercial product of the charge controlling agent include: quaternary ammonium salt BONTRON P-51, oxynaphthoic acid metal complex E-82, salicylic metal complex E-84, phenolic condensate E-89 (manufactured by Orient Chemical Industries Ltd.); molybdenum complex of quaternary ammonium salt TP-302 and TP-415, and metal complex of salicylic acid TN-105 (manufactured by Hodogaya Chemical Co., Ltd.); quaternary ammonium salt copy charge PSY VP2038, triphenylmethane derivatives copy blue PR, quaternary ammonium salt copy charge NEG VP2036, copy charge NX VP434 (manufactured by Hochst); LRA-901, boron complex LR-147 (manufactured by Japan Carlit Co., Ltd.); quinacridone; azo pigment; and a high molecular weight compound having sulfonic acid group, carboxyl group, or quaternary ammonium salt group.

An amount of the charge controlling agent is appropriately selected depending on the intended purpose without any limitation, but it is preferably 0.5 parts by mass to 5 parts by mass, more preferably 1 part by mass to 3 parts by mass, relative to 100 parts by mass of the pressure plastic material. When the amount thereof is smaller than 0.5 parts by mass, the charging properties of a toner may be impaired. When the amount thereof is greater than 5 parts by mass, the charge of a toner becomes exceedingly enhanced, decreasing the effect of the charge controlling agent primarily used. Thus, an electrostatic force between the toner and a developing roller increases, which may cause low flowability of a developer, or low image density.

<<Crystalline Polyester>>

The crystalline polyester is appropriately selected from those known in the art depending on the intended purpose without any limitation, but it is preferably crystalline polyester having a sharp molecular weight and a low molecular weight in view of excellent low temperature fixing ability of a resulting toner. More preferred is the crystalline polyester having a peak in the range of 3.5 to 4.0 in a molecular weight M distribution curve of a o-dichlorobenzene soluble component as measured by GPC, where a peak width is 1.5 or less, and a horizontal axis is log(M) and a vertical axis is % by mass, having a weight molecular weight (Mw) of 1,000 to 30,000, a number average molecular weight (Mn) of 500 to 6,000, and Mw/Mn of 2 to 8. A melting point and F1/2 temperature of the crystalline polyester are appropriately selected depending on the intended purpose without any limitation, but they are preferably low, as long as heat resistant storage stability is not impaired. The DSC endothermic peak temperature thereof is more preferably 50° C. to 150° C. The F1/2 temperature is measured as follows. A sample with a volume of 1 cm$^2$ is melted and allowed to flow using a elevated flow tester CFT-500 (manufactured by Shimadzu Corporation) under the following conditions: diameter of die: 1 mm; pressure applied: 10 kg/cm$^2$; and heating rate: 3° C./min. Then, the temperature, at which half of the amount of the sample that has flowed from the flow starting time to the flow ending time is considered to have flowed, is defined as the F1/2 temperature of the sample. When the melting temperature and the F1/2 temperature are lower than 50° C., the heat-resistant storage stability may be degraded, and blocking may readily occur even at internal temperature of the developing device. When the melting temperature and the F1/2 temperature are higher than 150° C., sufficient low temperature fixing ability may not be obtained because the minimum fixing temperature becomes high.

An acid value of the crystalline polyester is appropriately selected depending on the intended purpose without any limitation, but it is preferably 5 mgKOH/g or greater in view of an affinity between paper and the resin, and low temperature fixing ability of a resulting toner, and more preferably 10 mgKOH/g or greater. Moreover, an acid value of the crystalline polyester is preferably 45 mgKOH/g or less in view of hot offset resistance of a toner. A hydroxyl value of the crystalline polyester is appropriately selected depending on the intended purpose without any limitation, but it is preferably 0 mgKOH/g to 50 mgKOH/g in view of low temperature fixing ability and charging properties of a resulting toner, and more preferably 5 mgKOH/g to 50 mgKOH/g.

An amount of the crystalline polyester is appropriately selected depending on the intended purpose without any limitation, but it is preferably 0 parts by mass to 900 parts by mass, more preferably 0.5 parts by mass to 500 parts by mass, and even more preferably 1 part by mass to 100 parts by mass, relative to 100 parts by mass of the pressure plastic material. When the amount thereof is smaller than 1 part by mass, low temperature fixing ability of a toner may not be achieved. When the amount thereof is greater than 900 parts by mass, the hot offset resistance of a toner may be impaired.

<<Other Components>>

Other components usable in combination with the pressure plastic material include a flow improving agent, and a cleaning improving agent. The flow improving agent is an agent that improves hydrophobic properties of a toner through a surface treatment with the agent, and is capable of preventing degradation of flowability or charging properties of the toner even in high humidity environments. Examples of the flow improving agent include a silane coupling agent, a sililating agent, a silane coupling agent having a fluorinated alkyl group, an organotitanate coupling agent, an aluminum-based coupling agent, silicone oil, and modified silicone oil.

The cleaning improving agent is an agent added to the toner material to remove the developer remained on a photoconductor or primary transfer medium (e.g., intermediate transfer belt) after transferring. Examples of the cleaning improving agent include: fatty acid (e.g. stearic acid) metal salt, such as zinc stearate, and calcium stearate; and polymer particles prepared by soap-free emulsion polymerization, such as polymethyl methacrylate particles, and polystyrene particles. As the polymer particles, preferred are polymer particles having a relatively narrow particle size distribution, and more preferred are polymer particles having the volume average particle diameter of 0.01 μm to 1 μm.

<<Compressive Fluid>>

Figure 2:
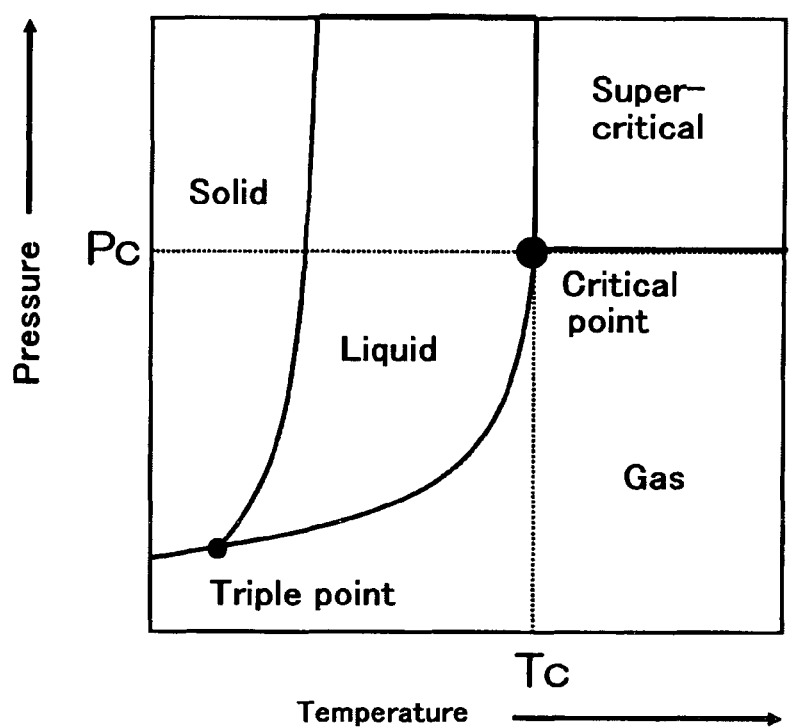
FIG. 2 is a general phase diagram showing the state of a substance varying depending on pressure and temperature conditions.
Figure 3:
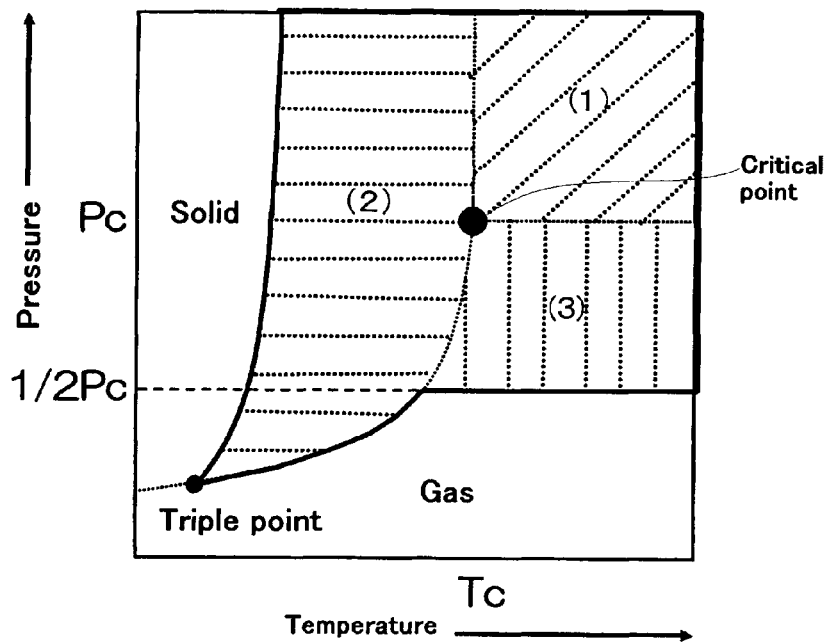
FIG. 3 is a phase diagram which defines a compressive fluid.

Next, the compressive fluid for use in the production method of the present embodiment will be explained with reference to FIGS. 2 and 3. FIG. 2 is a phase diagram illustrating a state of a substance depending on temperature and pressure. FIG. 3 is a phase diagram which defines a compressive fluid. The compressive fluid has characteristics that it is fast in mass transfer and heat transfer, is low in viscosity, and can continuously greatly change the density, dielectric constant, solubility parameter, free volume and the like by changing the temperature and pressure. Since the compressive fluid has an extremely small surface tension compared to those of organic solvents, the compressive fluid can follow a minute undulation (surface) to wet the surface with the compressive fluid. Moreover, the compressive fluid can be easily separated from a product, such as a toner, by returning the pressure to normal pressure, and therefore the compressive fluid can be recycled. Accordingly, the production method of the present embodiment can reduce environmental load due to the production, compared to the production using water or an organic solvent.

In the present embodiment, the "compressive fluid" refers to a substance present in any one of the regions (1), (2) and (3) of FIG. 3 in the phase diagram of FIG. 2. In such regions, the substance is known to have extremely high density and show different behaviors from those shown at normal temperature and normal pressure. Note that, the substance present in the region (1) is a supercritical fluid. The supercritical fluid is a fluid that exists as a noncondensable high-density fluid at a temperature and a pressure exceeding the corresponding critical points, which are limiting points at which a gas and a liquid can coexist. Also, the supercritical fluid does not condense even when compressed, and exists at critical temperature or higher and critical pressure or higher. Moreover, the substance present in the region (2) is a liquid, but in the present embodiment, is a liquefied gas obtained by compressing a substance existing as a gas at normal temperature (25° C.) and normal pressure (1 atm). Further, the substance present in the region (3) is a gas, but in the present invention, is a high-pressure gas whose pressure is ½ Pc or higher.

In the present embodiment, examples of the substance usable as the compressive fluid include carbon monoxide, carbon dioxide, nitrogen monoxide, nitrogen, air, oxygen, argon, helium, neon, krypton, methane, ethane, propane, 2,3-dimethyl butane, ethylene, ammonia, n-butane, isobutane, n-pentane, isopentane, and chlorotrifluoromethane. These may be used alone or in combination.

In the production method of the present embodiment, a compressive fluid for melting the pressure plastic material (which may be also referred to as a first compressive fluid, hereinafter) is appropriately selected depending on the intended purpose without any limitation, but it is preferably carbon dioxide, as it can easily form a supercritical state, it is noninflammable and has high safety, it has excellent affinity to a carbonyl structure, and it contributes to produce a toner having a hydrophobic surface in the production of the toner. Note that, the carbon dioxide has excellent affinity to a carbonyl structure.

In the production method of the present embodiment, other than the first compressive fluid, a second compressive fluid may also be used. The second compressive fluid is supplied to a melt when the melt is jetted.

The second compressive fluid is not particularly limited, and examples thereof include substances listed above as the aforementioned compressive fluid. As for the second compressive fluid, preferably used is a nitrogen-containing compressive fluid that is a substance, such as oxygen and nitrogen, having the maximum inversion temperature of 800 K or lower. Here, the "nitrogen-containing" means containing nitrogen molecules, and it can be said that the air is also "nitrogen-containing." The nitrogen has the maximum inversion temperature of 620 K, and has the low maximum inversion temperature compared to that of a substance, such as carbon dioxide (maximum inversion temperature: 1,500 K). Therefore, reduction in temperature due to the Joule-Thomson effect when the pressure of nitrogen is reduced is small compared to the case where the pressure of the carbon dioxide is reduced. When the maximum inversion temperature of the second compressive fluid is excessively high, such as in the case of the carbon dioxide, cooling due to the Joule-Thomson effect becomes excessive when the melt is jetted. Therefore, the melt is solidified before the melt is formed into particles. As a result, fibrous or cohesion products may be included in a final product. When the cooling is excessive, moreover, the melt may be solidified inside a nozzle, which is used for jetting the melt, and therefore it may not be able to produce particles having small particle diameter with a narrow particle size distribution over a long period.

In the present embodiment, moreover, the compressive fluid may be used in combination with an entrainer (cosolvent). Examples of the entrainer include: alcohol, such as methanol, ethanol, and propanol; ketone, such as acetone, and methyl ethyl ketone; and an organic solvent, such as toluene, ethyl acetate, and tetrahydrofuran.

In the case where the particles produced by the production method of the present embodiment are a toner, moreover, another fluid may be used in combination with the compressive fluid. As for another fluid, preferred are fluids that can easily control solubility of a toner composition. Specific examples thereof include methane, ethane, propane, butane, and ethylene.

<Apparatus for Producing Particles>

Figure 4:
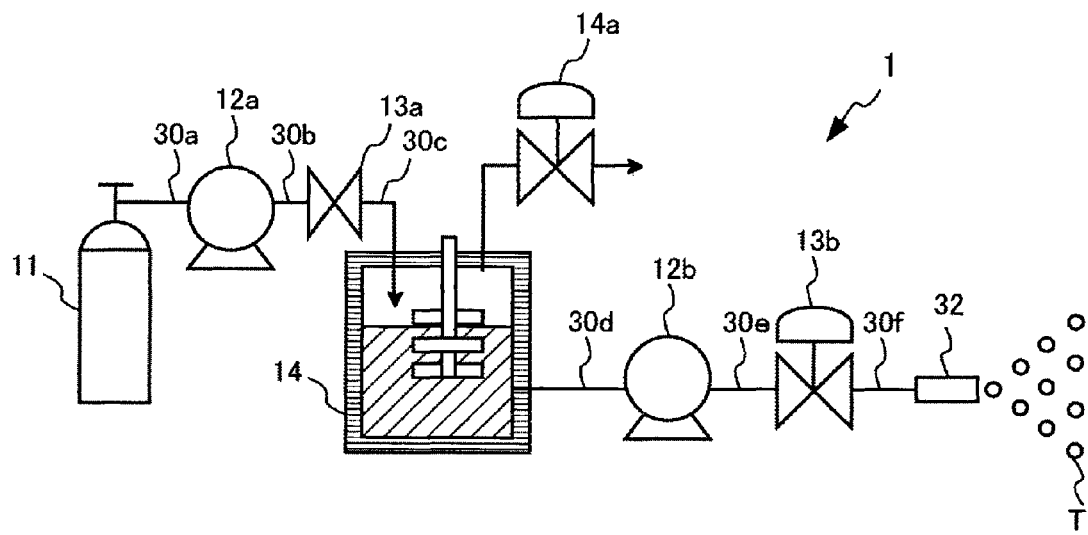
FIG. 4 is a schematic diagram illustrating one example of a device for producing particles for use in the method for producing particles of the present invention.
Figure 5:
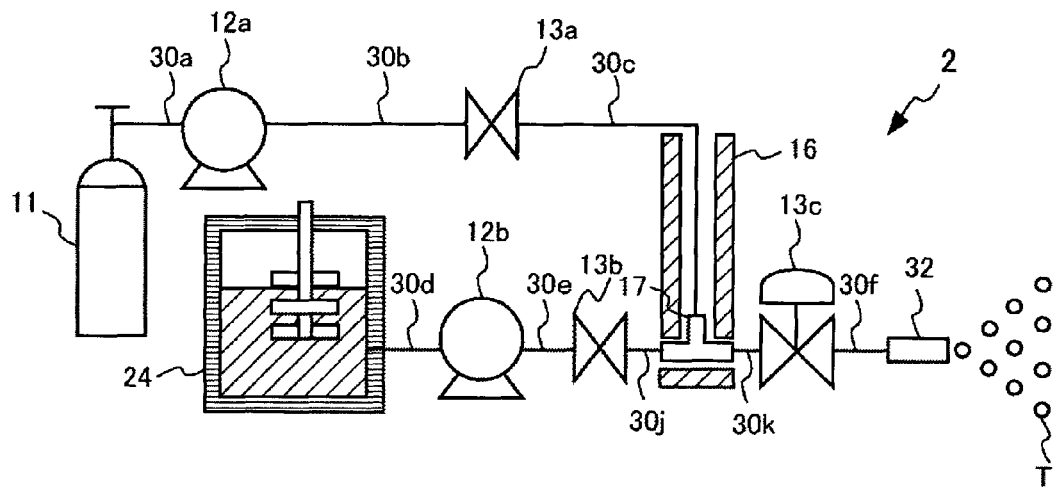
FIG. 5 is a schematic diagram illustrating one example of a device for producing particles for use in the method for producing particles of the present invention.
Figure 6:
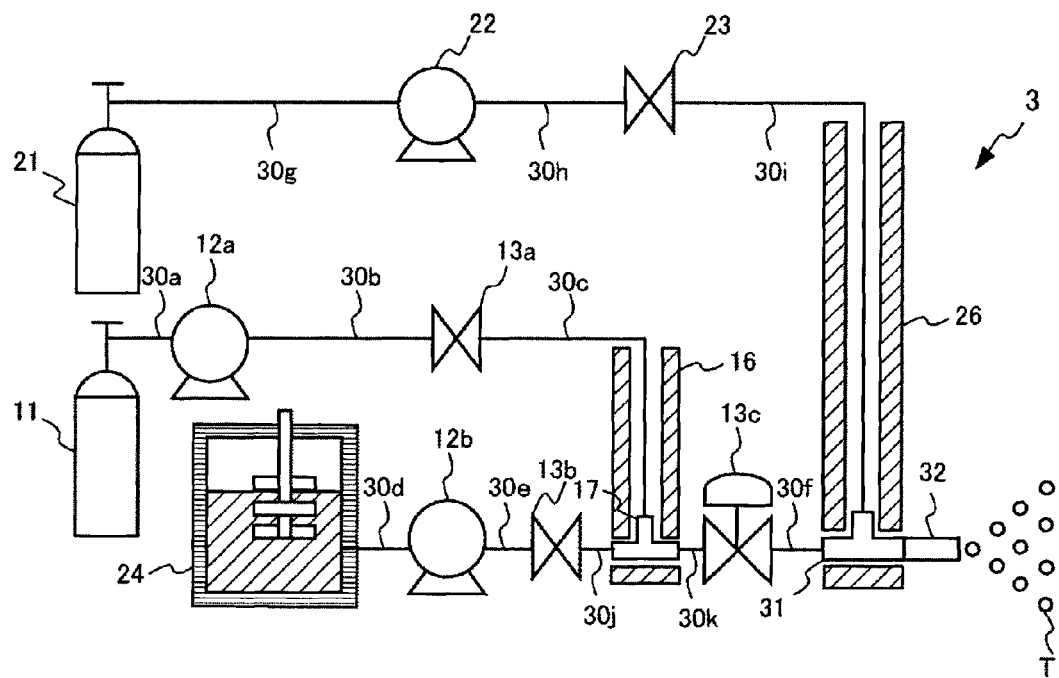
FIG. 6 is a schematic diagram illustrating one example of a device for producing particles for use in the method for producing particles of the present invention.

Next, the apparatus for producing particles for use in the present embodiment will be explained with reference to FIGS. 4, 5, and 6. FIGS. 4 to 6 are each a schematic diagram illustrating one example of an apparatus for producing particles. First, an apparatus for producing particles 1 will be explained with reference to FIG. 4. The apparatus for producing particles 1 contains a bomb 11, pump 12a, valve 13a, high pressure cell 14, pump 12b, valve 13b, and nozzle 32, which are connected with super high pressure pipes (30a, 30b, 30c, 30d, 30e, 30f).

The bomb 11 is a pressure resistant container for storing and supplying a first compressive fluid. The bomb 11 may store gas or a solid that will be a compressive fluid upon application of heat or pressure during the process that it is supplied to the high pressure cell 14, or within the high pressure cell 14. In this case, the gas or solid stored in the bomb 11 is turned into the state of (1), (2) or (3) of the phase diagram of FIG. 3 in the high pressure cell 14 by applying heat or pressure. The pump 12a is a device for sending the compressive fluid stored in the bomb 11 to the high pressure cell 14. The valve 13a is a device configured to open or close a path between the pump 12a and the high pressure cell 14 to adjust the flow rate of the compressive fluid, or to shut off the flow thereof.

The high pressure cell 14 is equipped with a thermoregulator, and is a device configured to bring the compressive fluid, which has been supplied through the valve 13a, and a pressure plastic material, which has been loaded in the high pressure cell 14 in advance, into contact at predetermined temperature or lower to melt the pressure plastic material. A back pressure valve 14a is provided to the high pressure cell 14, and the internal pressure of the high pressure cell 14 can be controlled by opening or closing the back pressure valve 14a. Moreover, a stirrer is provided to the high pressure cell 14, and the compressive fluid and the pressure plastic material can be mixed by stirring using the stirrer.

The pump 12b is a device for sending the melt in the high pressure cell 14 to the nozzle 32. The valve 13b is a device configured to open or close the path between the pump 12b and the nozzle 32 to adjust the flow rate of the melt, which has been obtained by melting the pressure plastic material, or to shut off the flow thereof. The nozzle 32 is provided at an edge of the super high pressure pipe 30f, and a device configured to jet the melt. A type of the nozzle 32 is appropriately selected depending on the intended purpose without any limitation, provided that it is a two-fluid nozzle or three-fluid nozzle capable of mixing the melt with the compressive fluid. Specific examples of the nozzle will be described later.

The compressive fluid is not particularly limited, but in view of a cost and safety, nitrogen or air is preferably used. Moreover, the compressive fluid includes a compressive fluid in the supercritical state.

A diameter of the nozzle 32 is not particularly limited, as long as the pressure can be maintained constant during jetting. When the diameter of the nozzle 32 is excessively large, the pressure at the time of jetting excessively decreases, and the viscosity of the melt is increased, possibly causing difficulty in producing particles. In some cases, it is necessary to provide a large supply pump for maintaining the pressure. On the other hand, when the diameter of the nozzle is excessively small, the nozzle 32 is easily clogged with the melt, possibly causing difficulty in obtaining desired particles. Accordingly, the upper limit of the diameter of the nozzle is preferably 500 μm or smaller, more preferably 300 μm or smaller, and even more preferably 100 μm or smaller. Moreover, the lower limit of the diameter of the nozzle is preferably 5 μm or greater, more preferably 20 μm or greater, and even more preferably 50 μm or greater.

In the apparatus for producing particles 1, the melt in the high pressure cell 14 is not directly jetted. The melt is passed through the super high pressure pipes (30d, 30e, 30f), followed by jetted from the nozzle 32. As a result of this, the compressive fluid mixed at the high pressure cell 14 is sufficiently diffused in the pressure plastic material, and therefore the productivity improves.

An apparatus for producing particles 2 will be explained next with reference to FIG. 5. In the explanation of the apparatus for producing particles 2, the units, systems, and devices identical to those of the apparatus for producing particles 1 of FIG. 4 are identified with the same reference numbers, and explanations thereof are emitted.

The apparatus for producing particles 2 contains a cell 24, a pump 12b, a valve 13b, a blending device 17, a valve 13c, and a nozzle 32, which are connected with super high pressure pipes (30d, 30e, 30j, 30k, 30f). In the apparatus for producing particles 2, the valve 13a is connected to the blending device 17 with the super high pressure pipe 30c. Moreover, the super high pressure pipe 30c is equipped with a heater 16.

The bomb 11 is a pressure resistant container for storing and supplying a first compressive fluid. The bomb 11 may store therein gas or a solid that will be turned into a compressive fluid by heating the heater 16, or applying pressure by the pump 12a. In this case, the gas or solid stored in the bomb 11 is turned into a state of (1), (2), or (3) of the phase diagram of FIG. 3 in the blending device 17.

The cell 24 is equipped with a thermoregulator, and is a device configured to heat the pressure plastic material, which has been loaded in the cell 24 in advance. The cell 24 is also equipped with a stirrer, and the pressure plastic material can be heated homogeneously by stirring using the stirrer.

The blending device 17 is a device configured to continuously bring the pressure plastic material supplied from the cell 24 and the first compressive fluid supplied from the bomb 11 into contact with each other to mix. Specific examples of the blending device 17 include a conventional T-shape coupling, a swirl mixer which actively utilizes a swirl flow, and a central collision mixer in which two fluids are brought into collision in a mixing part. The valve 13c is a device configured to open or close the path between the blending device 17 and the nozzle 32 to adjust the flow rate of the melt, or to shut off the flow thereof.

In the case where the apparatus for producing particles 2 is used, particles can be produced without using the high pressure cell 14, and therefore the weight saving of the apparatus can be achieved. In the apparatus for producing particles 2, moreover, the pressure plastic material supplied from the cell 24 and the first compressive fluid supplied from the bomb 11 are continuously brought into contact with each other in the blending device 17 to thereby melt pressure plastic material in advance. As a result, the compressive fluid and the pressure plastic material can be continuously mixed at a constant rate, and therefore a uniform melt can be obtained.

Next, the apparatus for producing particles 3 will be explained with reference to FIG. 6. In the explanation of the apparatus for producing particles 3, the units, systems, and devices identical to those of the apparatus for producing particles 2 of FIG. 5 are identified with the same reference numbers, and explanations thereof are emitted.

The apparatus for producing particles 3 contains a bomb 21, a pump 22, and a valve 23, which are connected with super high pressure pipes (30g, 30h). Moreover, the apparatus for producing particles 3 contains a blending device 31, which is connected to a nozzle 32, connected to a valve 13c with a super high pressure pipe 30f, and connected to the valve 23 with a super high pressure pipe 30i. The super high pressure pipe 30i is equipped with a heater 16.

The bomb 21 is a pressure resistant container for storing and supplying a second compressive fluid. The bomb 21 may store gas or a solid, which will be turned into a compressive fluid by heating by a heater 26, or applying pressure by a pump 22. In this case, the gas or solid stored in the bomb 21 is turned into the state of (1), (2), or (3) of the phase diagram of FIG. 3 in the blending device 31 by heating or applying pressure. The pump 22 is a device configured to send the compressive fluid stored in the bomb 21 to the blending device 31. The valve 23 is a device configured to open or close the path between the pump 22 and the blending device 31 to adjust the flow rate of the compressive fluid, or to shut off the flow thereof.

The blending device 31 is a device configured to continuously bring the melt supplied from the blending device 17 and the second compressive fluid supplied from the bomb 21 into contact with each other to mix the melt and the second compressive fluid together. Specific examples of the blending device 31 include a conventional T-shape coupling, a swirl mixer which actively utilizes a swirl flow, and a central collision mixer in which two fluids are brought into collision in a mixing part.

In the apparatus for producing particles 3, the melt is jetted from the nozzle 32 while the second compressive fluid is supplied to the melt at the blending device 31. In this case, the viscosity of the melt of the pressure plastic material can be reduced by the pressure of the second compressive fluid, and therefore the productivity improves. As a result, it is possible to produce particles even through an amount of a wax component added to raw materials is small and a molecular weight of the pressure plastic material is high.

Note that, in the apparatuses for producing particles (1, 2, 3), a conventional coupling is used as the blending device (17, 31). In the case where fluids each having different viscosity, such as a resin melt and a compressive fluid, are mixed by means of a static mixer such as the one disclosed JP-B No. 4113452, it is often difficult to homogeneously mix both fluids together. The static mixer has a mixing element (element) in a tubular housing. This element does not have a moving part, but has a plurality of baffle plates arranged around a tube axis in the axial direction. In the case where the static mixer is used, the element in the tube gives actions of dividing, turning over, and reversing to the fluid to mix, in the process that the fluid goes through the tubular housing. Moreover, as another type of a static mixer, known is a static mixer in which a large number of elements, each of which is formed of a honeycomb-shaped plate containing polygonal cells, are arranged together. In such the static mixer, a fluid is mixed by receiving actions of dividing, turning over, and reversing, as the fluid sequentially moves through cells in a center part of the tube to cells in an outer part of the tube, and through the cells in the outer part of the tube to the cells in the center part of the tube.

When a high viscous fluid, such as a resin, and a low viscous fluid, such as a compressive fluid, are passed through any of the aforementioned static mixers, the low viscous fluid passes through a space between the element inside tube and the tube housing without receiving a mixing action from the element, and therefore these fluids cannot be homogeneously mixed. As countermeasure for such mixing failure, a method for designing a more complicated element structure, or a method for increasing a length of a mixer is considered. These countermeasures are, however, not an effective measure for preventing a low viscous fluid to pass through, and cause problems, such as an increase in pressure loss during mixing, increase in a size of a device, and increase in labor for washing.

Next, each step used in production of a toner, as one example of particles, using the apparatus for producing particles (1, 2, 3) will be explained. The method for producing particles of the present embodiment contains: bringing a compressive fluid and a pressure plastic material into contact with each other to melt the pressure plastic material (a melting step); and jetting a melt obtained by melting the pressure plastic material to form particles (a particle forming step), where the melt is jetted by a two-fluid nozzle or a three-fluid nozzle, as a jetting unit.

<<Melting Step>>

First, the melting step in the method for producing particles of the present embodiment will be explained. As described above, in the present embodiment, "melting" or "melted" means a state of a raw material, such as a pressure plastic material, that it is plasticized or liquidized as well as swollen as a result of the contact with the compressive fluid.

The method for precipitating the material in the supercritical fluid under the reduced pressure has been conventionally known as a rapid expansion of supercritical solutions (RESS) process. A target to be jetted used in a method known as the RESS process is formed by dissolving a material as a solute in a compressive fluid, and the fluid is uniformly compatible with the material. On the other hand, in the present embodiment, particles from gas saturated solution (PGSS) process are used. The melt, which is a target to be jetted in the PGSS process, is obtained, as described above, by bringing the compressive fluid into contact with the pressure plastic material, followed by wetting, so as to decrease the viscosity of the pressure plastic material. Thus, there is an interface between the compressive fluid and the melt of the pressure plastic material. Namely, the target to be jetted in the RESS process is in the state of compressive fluid-solid phase equilibrium. The target in the PGSS process is, on the other hand, in the state of gas-liquid phase equilibrium. Accordingly, even in the same jetting method using a compressive fluid, the phase state of the target to be jetted before jetted is different.

In the case where the apparatus for producing particles 1 is used, in the melting step, the high pressure cell 14 is first charged with raw materials, such as the pressure plastic material, and a colorant. In the case where the raw materials include a plurality of materials, these materials may be mixed by a mixer or the like in advance, and then melt kneaded by a roll mill or the like before the high pressure cell 14 is charged with the raw materials. Next, the high pressure cell 14 is sealed, and the raw materials is stirred by a stirrer of the high pressure cell 14. Subsequently, the pump 12a is operated to compress the first compressive fluid stored in the bomb 11, and the valve 13a is open to thereby supply the first compressive fluid into the high pressure cell 14. In the present embodiment, a carbonic acid gas (carbon dioxide) bomb is used as the bomb 11.

The temperature inside the high pressure cell 14 is adjusted to the temperature at which the supplied carbon dioxide is turned into a compressive fluid, by a thermoregulator. Note that, the upper limit of the temperature inside the high pressure cell 14 is appropriately selected depending on the intended purpose without any limitation, but it is preferably equal to or lower than the thermal decomposition temperature of the pressure plastic material under the atmospheric pressure, more preferably equal to or lower than the melting point of the pressure plastic material. In the present embodiment, the thermal decomposition temperature means onset temperature for weight loss of a sample due to thermal decomposition thereof, as measured by a thermo gravimetry analyzer (TGA). When the temperature inside the high pressure cell 14 is higher than the thermal decomposition temperature, the pressure plastic material may be oxidized, or may be deteriorated due to scission of molecular chains thereof, which may lead to low durability of the pressure plastic material. Moreover, a resulting toner, as a final product, may have undesirable color tone, transparency, fixing property, heat resistant storage stability, and charging property. Further, energy consumption of the heating process increases.

The pressure in the high pressure cell 14 can be adjusted to the predetermined pressure by adjusting the pump 12a, and the back pressure valve 14a. In the melting step of the method for producing particles of the present embodiment, the pressure applied to the raw materials, such as the pressure plastic material, in the high pressure cell 14 is appropriately selected depending on the intended purpose without any limitation, but it is preferably 1 MPa or greater, more preferably 10 MPa to 200 MPa, and even more preferably 31 MPa to 100 MPa. When the pressure inside the high pressure cell 14 is less than 1 MPa, it may not be able to attain a plasticizing effect enough to form the pressure plastic material into particles. It is no problem however high the pressure inside of the high pressure cell 14 is, but the higher pressure thereof requires the more durable device, which increase an equipment cost.

In the high pressure cell 14, the pressure plastic material is melted by bringing the compressive fluid and the raw materials containing the pressure plastic material into contact with each other. In this case, the melt obtained by melting the pressure plastic material is stirred by the stirrer until the viscosity of the melt becomes constant. The viscosity of the melt is not particularly limited, provided that it is the viscosity at which the melt can be jetted by the nozzle 32. The lower the viscosity thereof is easier to form the melt into fine particles as jetted. To attain a toner realizing a high image quality, the viscosity of the melt is appropriately selected depending on the intended purpose without any limitation, but it is preferably 20 mPa·s or lower under the temperature and pressure of the melt as the melt is jetted. When the viscosity of the melt is greater than 20 mPa·s, coarse particles may be formed, which may lead to a wide particle size distribution of the resulting particles.

The phrase "the temperature and pressure of the melt as the melt of the pressure plastic material is jetted" means the temperature and pressure of the melt supplied to a nozzle during jetting in the particle forming step.

The viscosity can be measured by charging a high pressure cell with a sample composed of the pressure plastic material and the compressive fluid (high pressure carbon dioxide) and performing a measurement by means of a vibration viscometer (XL7, manufactured by Hydramotion Ltd.) at 150° C., and 40 MPa. For the measurement of the viscosity, the sample is set in a measuring part, the sample is controlled to have the temperature and pressure when the melt of the pressure plastic material is jetted (e.g., 150° C. and 40 MPa). When the viscosity of the sample becomes constant, such viscosity is determined as a viscosity at such temperature and pressure.

Note that, as the pressure plastic material is used in the present embodiment, reduction in the viscosity of the pressure plastic material is accelerated by the pressure of the compressive fluid. Therefore, the pressure plastic material and the compressive fluid are homogeneously mixed to thereby provide a melt having low viscosity.

In the case where the apparatus for producing particles (2, 3) is used, in the melting step, a cell 24 is first charged with raw materials, such as a pressure plastic material, and a colorant. In the case where the raw materials include a plurality of substances, these substances may be mixed by a mixer, and melt kneaded by a roll mill in advance to add the raw materials to the cell 24. Next, the cell 24 is sealed, and the raw materials are stirred by a stirrer of the cell 24 and heated. The temperature in the cell 24 is not particularly limited, as long as it is temperature at which the pressure plastic material is plasticized. As a result of the heating, the pressure plastic material is plasticized.

Subsequently, the pump 12a is operated to compress the carbon dioxide serving as the first compressive fluid stored in the bomb 11, and the valve 13a is open, to thereby supply the first compressive fluid to the blending device 17. Note that, in the present embodiment, a carbonic acid gas (carbon dioxide) bomb is used as the bomb 11. The first compressive fluid to be supplied is heated by a heater 16 in the super high pressure pipe 30c. The set temperature of the heater 16 is not particularly limited, as long as it is temperature at which the supplied carbon dioxide is turned into the compressive fluid.

Subsequently, the pump 12b is operated and the valve 13b is open. As a result, the pressure plastic material supplied from the cell 24, and the first compressive fluid supplied from the bomb 11 are continuously brought into contact with each other and homogeneously mixed in the blending device 17, to thereby melt the pressure plastic material. The viscosity of the melt obtained by melting the pressure plastic material is preferably 20 mPa·s or lower for obtaining a toner capable of achieving high image quality.

In the apparatus for producing particles (2, 3), the pressure plastic material is plasticized in advance in the cell 24, and the pressure plastic material and the compressive fluid are brought into contact with each other and mixed after reducing a difference in the viscosity between the pressure plastic material and the compressive fluid. Therefore, a uniform melt can be attained. Note that, the pressure plastic material is plasticized in advance in the cell 24 by applying heat, but the pressure plastic material may be plasticized in advance by applying pressure, or applying heat and pressure.

<<Particle Forming Step>>

Next, the particle forming step of the production of particles will be explained. In the case where the apparatus for producing particles (1, 2) is used, the mixture obtained by bringing the compressive fluid and the pressure plastic material into contact each other in the high pressure cell 14 or the blending device 17 is jetted from a nozzle 32 by opening the valve 13c. During this operation, the back pressure valve 14a, pumps (12a, 12b), thermoregulator, and the like are controlled to maintain constant temperature and pressure of the high pressure cell 14 or cell 24. In this case, the pressure inside the high pressure cell 14 or blending device 17 is not particularly limited. The melt jetted from the nozzle 32 is formed into particles, followed by solidified. In the case where the apparatus for producing particles 2 is used, the pressure plastic material and the compressive fluid are continuously brought into contact with each other in the blending device 17 to supply the obtained melt to the nozzle 32, and therefore particles can be continuously formed.

In the case where the apparatus for producing particles 3 is used, first, the pump 22 is operated and the valve 23 is open so that a second compressive fluid stored in the bomb 21 is supplied to the blending device 31. In the present embodiment, a nitrogen bomb is used as the bomb 21. The pressure of the supplied second compressive fluid is appropriately selected depending on the intended purpose without any limitation, but it is preferably 1 MPa or greater, more preferably 10 MPa to 200 MPa, and even more preferably 31 MPa to 100 MPa. When the pressure applied to the second compressive fluid is smaller than 1 MPa, it may not be able to attain a plasticizing effect enough to form the pressure plastic material into particles. It is no problem however high the pressure is, but higher pressure thereof requires the more durable device, which increase an equipment cost. The second compressive fluid to be supplied is heated by a heater 26 in the super high pressure pipe 30i. The set temperature of the heater 26 is not particularly limited as long as it is temperature at which the supplied nitrogen is turned into a compressive fluid.

Next, the pumps (12a, 12b) are operated to supply the melt of the pressure plastic material from the blending device 17 to the blending device 31. During this operation, the pumps (12a, 12b), thermoregulator and the like are controlled to maintain constant temperature and pressure inside the cell 24. In this case, the pressure inside the cell 24 is not particularly limited, but it can be set equal to the pressure of the compressive fluid supplied from a second path. The melt supplied from the blending device 17 and the second compressive fluid supplied from the bomb 21 are homogeneously mixed in the blending device 31. As a result, the melt is jetted from the nozzle 32 under the atmospheric pressure utilizing the pressure difference, while supplying the second compressive fluid to the melt.

In this case, the solid content of the melt jetted is reduced by the supplied second compressive fluid, and therefore the viscosity of the melt is further reduced. As a result, the jet speed (outlet linear speed) increases and shearing force to the melt increases due to the increase in the outlet linear speed, as well as controlling the temperature of the jetted melt constant. Since nitrogen is used as the second compressive fluid, moreover, a decrease in temperature due to the Joule-Thomson effect, which is caused along the change in the pressure adjacent to the nozzle 32, is inhibited, which prevents clogging of the nozzle 32. The melt jetted from the nozzle 32 is formed into particles, followed by solidified. During this process, uniform fine particles without cohesion can be obtained over a long period because of a synergistic effect of the low viscosity and low solid content of the melt. Moreover, shapes of produced particles can be also uniformly stabilized. In the case where the apparatus for producing particles 3 is used, the melt obtained by continuously bringing the pressure plastic material and the compressive fluid into contact in the blending device 17 is supplied to the nozzle 32, and therefore particles can be continuously formed.

<<Nozzle>>

Specific examples of the structure of the nozzle will be explained with reference to FIGS. 7, 8, and 9.

—Characteristics of Two-Fluid Nozzle—

The two-fluid nozzle is one type of nozzles employing a system where a compressive gas and a melt, which are separated into two lines, are mixed and jetted. Compared to a one-fluid nozzle which performs spraying only a pump of a melt, by means of the two-fluid nozzle, a high speed air flow pulverizes the melt to thereby form the melt into fine particles. Moreover, the two-fluid nozzle can have an opening diameter larger than that of the one-fluid nozzle, and therefore less clogging of foreign matter is caused, and a controlling range of a liquid flow rate becomes wide.

The compressive gas is not particularly limited, but is preferably nitrogen, or air. Moreover, the compressive gas includes a compressive fluid in a super critical state.

Figure 7:
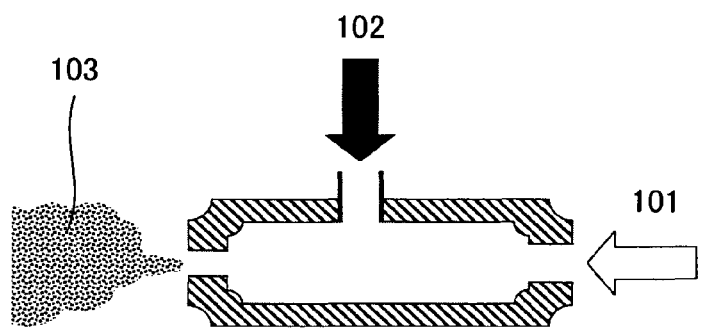
FIG. 7 is a schematic diagram illustrating one example of a nozzle for use in the method for producing particles of the present invention.

Especially, the nozzle of the external mixing type as illustrated in FIG. 7 is configured to mix the compressive gas 101 and the melt 102 outside the nozzle, and therefore it has characteristics that it is resistant to clogging. In FIG. 7, 103 represents particles.

Figure 8:
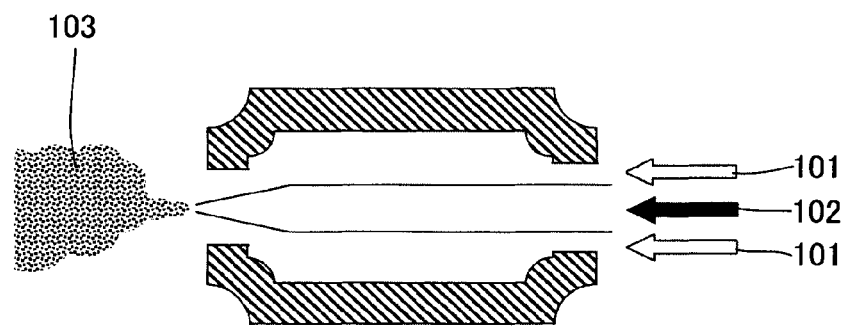
FIG. 8 is a schematic diagram illustrating another example of a nozzle for use in the method for producing particles of the present invention.

Moreover, the nozzle of the internal mixing type as illustrated in FIG. 8 is configured to mix the compressive gas 101 and the melt 102 inside the nozzle to form particles 103, and to spray the particles outside the nozzle. Therefore, it has characteristics that the melt can be desirably formed into fine particles.

—Characteristics of Three-Fluid Nozzle—

Figure 9:
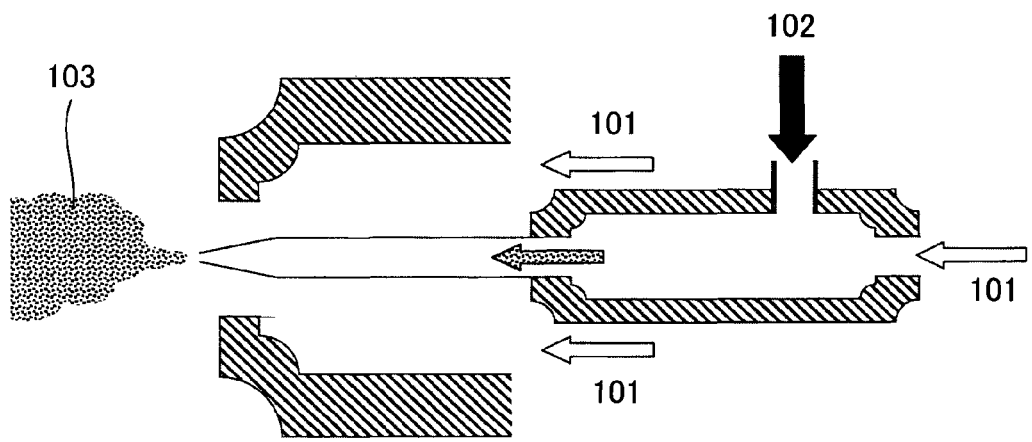
FIG. 9 is a schematic diagram illustrating yet another example of a nozzle for use in the method for producing particles of the present invention.

The three-fluid nozzle illustrated in FIG. 9 is a three-fluid nozzle in which a compressive gas 101 is passed from the outer circumference of a two-fluid nozzle. This type of the three-fluid nozzle gives a crashing effect, as a space around the nozzle is made large. Coarse particles are reduced by the crashing effect, to thereby produce particles having small diameters with a narrow particle size distribution. Note that, in FIG. 9, 102 represents a melt, and 103 represents particles.

(Particles)

In the present embodiment, a case where a toner is produced is explained, but the particles produced are not limited to the toner and are appropriately selected depending on the intended purpose. For example, the particles may be particles of daily use products, medical products, or cosmetic products. A shape, size and material of the particles produced by the production method of the present embodiment are appropriately selected depending on intended purpose of a final product without any limitation. In accordance with the production method of the present embodiment, particles can be produced without using an organic solvent, as a compressive fluid is used. Therefore, particles, which contain substantially no organic solvent, can be obtained. Note that, the phrase "the particles, which contain substantially no organic solvent," means that an amount of the organic solvent in the particles as measured by the following method is equal to or less than the detection limit.

<Measurement Method of Residual Solvent>

The amount of the residual solvent of the particles is measured in the following measurement method. To 1 part by mass of particles to be measured, 2 parts by mass of 2-propanol is added, and dispersed by ultrasonic wave for 30 minutes, and then the mixture is stored in a refrigerator (at 5° C.) for 1 day or longer, to thereby extract a solvent in the particles. A supernatant liquid is analyzed by gas chromatography (GC-14A, manufactured by Shimadzu Corporation), to determine the amount of the solvent and a residual monomer in the particles. Thus, the concentration of the solvent is measured. The measurement conditions for such analysis are as follows.

Device: Shimadzu GC-14A
Column: CBP20-M 50-0.25
Detector: FID
Injection volume: 1 μL to 5 μL
Carrier gas: He 2.5 kg/cm$^2$
Flow rate of hydrogen: 0.6 kg/cm$^2$
Flow rate of air: 0.5 kg/cm$^2$
Chart speed: 5 mm/min
Sensitivity: Range 101×Atten 20
Column temperature: 40° C.
Injection temperature: 150° C.

Moreover, the particles of the present embodiment have pores inside the particles, and the average maximum Feret diameter of the pores is 10 nm or greater but smaller than 500 nm. Particularly, the average maximum Feret diameter of the pores is preferably 10 nm or greater but smaller than 300 nm. The maximum Feret diameter is a diameter having the largest space between two parallel lines, when a target is sandwiched between the two parallel lines.

In the case where the particles are used as a toner, the particles having pores give, for example, the following effect: (1) consumption powder for fixing a toner to a recording medium (paper) can be reduced; (2) added external additives, such as hydrophobic silica, are hardly embedded in toner particles, and a toner has a long service life; and (3) stirring stress applied when a toner is mixed with a carrier and is charged is reduced, and thus the energy spent for the stirring can be reduced.

The average maximum Feret diameter of the pores can be measured in the following manner.

A cross-section of the particles is observed under an electron microscope or the like, and a cross-section photograph thereof is taken. The obtained cross-section photograph is processed using an image processing software to binarize the image, to thereby identify the pores. Thirty pores are selected from the identified pores in the order of those having the larger maximum Feret diameter, and the average value thereof is determined as the average maximum Feret diameter of the pores.

<<Toner>>

The toner produced by the production method of the present embodiment is not particularly limited in terms of its properties, such as a shape, and size, but the toner preferably has the following image density, average circularity, mass average particle diameter and ratio (mass average particle diameter/number average particle diameter) of the mass average particle diameter to number average particle diameter.

As for the image density of the toner, the gray level thereof as measured by a spectrometer (938 spectrodensitometer, manufactured by X-Rite) is preferably 1.90 or greater, more preferably 2.00 or greater, and even more preferably 2.10 or greater. When the image density is less than 1.90, the image density of an image is low, and therefore a high quality image may not be obtained.

Here, the image density can be measured, for example, in the following manner. By means of IMAGIO Neo 450

(manufactured by Ricoh Company Limited), a solid image is formed on a photocopy sheet (TYPE6000<70W>, manufactured by Ricoh Company Limited) to give a developer deposition amount of 1.00 mg/cm$^2$±0.05 mg/cm$^2$ with a fixing roller having surface temperature of 160° C.±2° C. The image density of the obtained solid image is measured at randomly selected 6 points by means of the aforementioned spectrometer. The average value is calculated from the measured values, and determined as the image density.

The average circularity of the toner is a value obtained by dividing a circumferential length of an equivalent circle having the same projection area to that of the toner by a circumferential length of an actual particle, and is appropriately selected depending on the intended purpose without any limitation. The average circularity of the toner is preferably 0.900 to 0.980, more preferably 0.950 to 0.975. Moreover, a proportion of the particles having the average circularity of less than 0.94 in the toner is preferably 15% by mass or less. When the average circularity is less than 0.900, it may not be able to attain desirable transfer property, or to produce a high quality image without dusts. When the average circularity is more than 0.980, in an image forming system using blade cleaning technique, cleaning defects occur on a photoconductor or a transfer belt, image smear, for example, in a case of formation of an image having a high-image area ratio such as photographic image, a toner forming an untransferred image due to a paper-feeding defect or the like accumulates on the photoconductor remains an untransferred toner thereon, and the untransferred toner may cause background smear on images, or a charging roller etc. that contact-charges the photoconductor is contaminated with the untransferred toner, thereby the toner may not exert its intrinsic charging ability.

The average circularity of the toner can be measured by means of a flow particle image analyzer, for example, a flow particle image analyzer FPIA-2000, manufactured by Sysmex Corporation. In the measurement, fine dust is removed from water using a filter, such that the number of particles inside a measured area (for example, 0.60 μm or larger but smaller than 159.21 μm in circle equivalent diameter) in 10$^{-3}$ cm$^3$ of the water is 20 or fewer, then a few drops of a nonionic surfactant (preferably, CONTAMINON N, manufactured by Wako Pure Chemical Industries, Ltd.) are added into 10 mL of the water. Then 5 mg of a measurement sample is further added in the water, dispersion is carried out for 1 minute under conditions of 20 kHz and 50 W/10 cm$^3$ using the ultrasonic dispersing apparatus UH-50 (manufactured by SMT Co., Ltd.), dispersion is further carried out for a total of 5 minutes, and the particle size distribution of particles which are 0.60 μm or larger but smaller than 159.21 μm in circle equivalent diameter is measured using a sample dispersion liquid in which the measurement sample has a particle concentration of 4,000 number/10$^{-3}$ cm$^3$ to 8,000 number/10$^{-3}$ cm$^3$ (when particles belonging to the measurement circle equivalent diameter range are targeted).

The measurement of the average circularity is performed by passing the sample dispersion liquid through a flow path (which widens with respect to the flow direction) of a flat, transparent flow cell (approximately 200 μm in thickness). To form an optical path which advances intersecting the thickness of the flow cell, a strobe and a CCD camera are provided so as to be positioned oppositely to each other with respect to the flow cell. A strobe light is emitted at intervals of 1/30 seconds to obtain images of particles flowing in the flow cell; as a result, the particles are photographed as two-dimensional images having certain areas which are parallel to the flow cell. Based upon the areas of the two-dimensional images of the particles, the diameters of circles having the same areas are calculated as circle equivalent diameters.

The circle equivalent diameters of 1,200 or more particles can be measured in approximately 1 minute, and the number of particles based upon the distribution of the circle equivalent diameters, and the proportion (number %) of particles having a prescribed circle equivalent diameter can be measured. The results (frequent % and cumulative %) can be obtained dividing the range of 0.06 μm to 400 μm into 226 channels (one octave is divided into 30 channels). The practical measurement of particles is carried out concerning particles which are 0.60 μm or lager but smaller than 159.21 μm in circle equivalent diameter.

The volume average particle diameter of the toner is appropriately selected depending on the intended purpose without any limitation, but it is preferably 3 μm to 10 μm, more preferably 3 μm to 8 μm.

When the volume average particle diameter is smaller than 3 μm, the toner of a two-component developer may be fused onto a surface of a carrier particle after being stirred over a long period in a developing device, lowering the charging ability of the carrier. In the case where the toner is a one-component developer, the toner with the volume average particle diameter of smaller than 3 μm may cause filming to a developing roller, or may be fused onto a member for thinning a toner layer, such as a blade. When the mass average particle diameter is greater than 10 μm, it is difficult to produce an image having high resolution and high quality, and a variation in the particle size of the toner may be large when the toner is supplied to the developer to compensate the consumed toner.

A ratio (volume average particle diameter/number average particle diameter) of the volume average particle diameter to the number average particle diameter of the toner is appropriately selected depending on the intended purpose without any limitation, but it is preferably 1.00 to 1.25, more preferably 1.00 to 1.10. When the ratio (volume average particle diameter/number average particle diameter) of the volume average particle diameter to the number average particle diameter is greater than 1.25, in case of a two-component developer, a toner is fused onto a surface of carrier due to stirring performed over a period in a developing device, which may reduce charging ability of the carrier. When the ratio (mass average particle diameter/number average particle diameter) of the mass average particle diameter to the number average particle diameter is greater than 1.25, in case of a one-component developer, the toner may cause filming to a developing roller, or may be fused onto a member for thinning a toner layer, such as a blade. Moreover, it is difficult to produce an image having high resolution and high quality, and a variation in the particle size of the toner may be large when the toner is supplied to the developer to compensate the consumed toner.

The volume average particle diameter and the ratio (volume average particle diameter/number average particle diameter) of the volume average particle diameter to the number average particle diameter can be measured, for example, by means of a particle size analyzer, Coulter Counter TAII, manufactured by Bechman Electronics, Inc.

<<Developer>>

Subsequently, the developer of the present embodiment will be explained. The developer of the present embodiment is appropriately selected depending on the intended purpose without any limitation, provided that it contains the toner produced by the aforementioned production method. Specific examples of the developer include a one-component developer containing the toner produced by the aforementioned production method, and a two-component developer containing the toner produced by the aforementioned production method and a magnetic carrier. Examples of the toner include a color toner (e.g., yellow, cyan, magenta, and black), and a clear toner.

—Magnetic Carrier—

The magnetic carrier is appropriately selected depending on the intended purpose without any limitation, provided that it contains a magnetic material. Examples of the magnetic carrier include hematite, iron powder, magnetite, and ferrite. An amount of the magnetic carrier is appropriately selected depending on the intended purpose without any limitation, but it is preferably 5 parts by mass to 50 parts by mass, more preferably 10 parts by mass to 30 parts by mass, relative to 100 parts by mass of the toner.

<Image Forming Apparatus>

Figure 10:
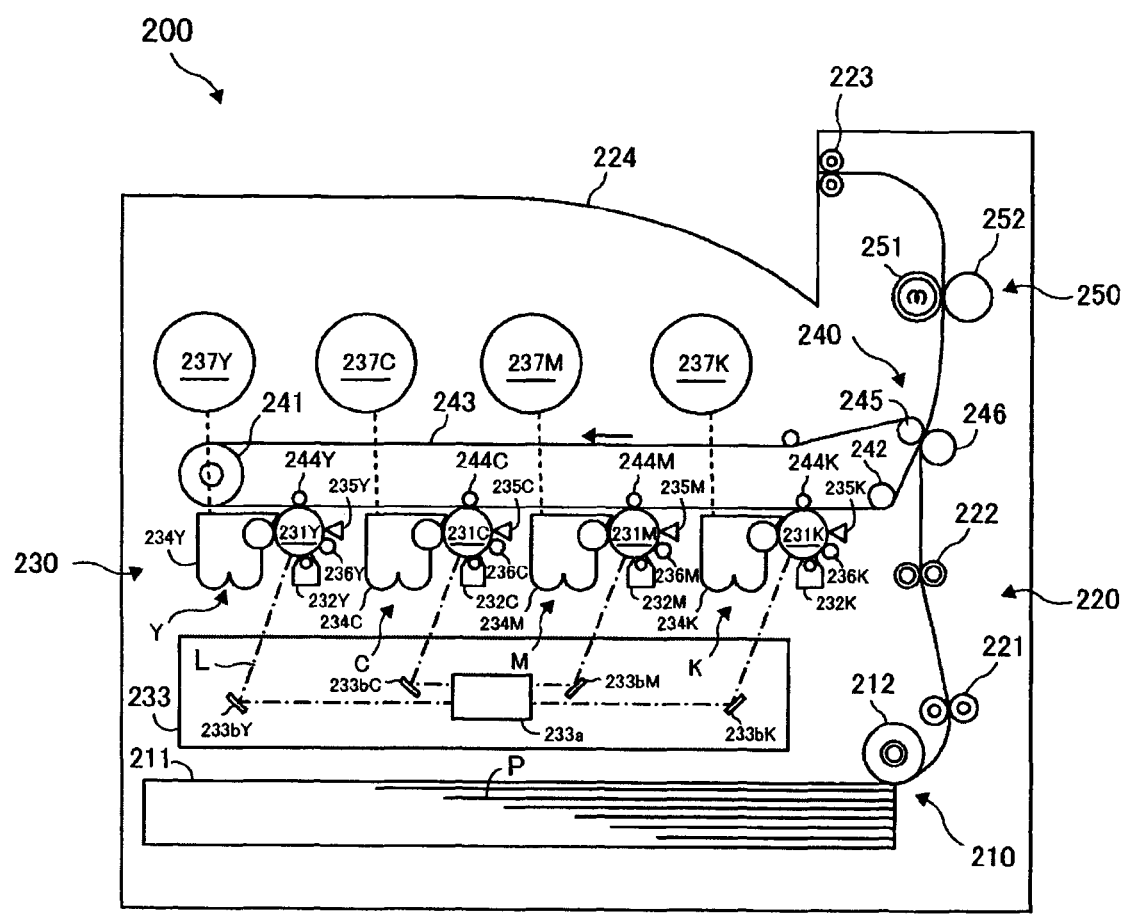
FIG. 10 is a schematic diagram illustrating a structure of an image forming apparatus for use in the present invention.

The image forming apparatus in accordance with the present embodiment is explained with reference to FIG. 10. FIG. 10 is a schematic diagram illustrating one embodiment of the image forming apparatus for use in the present invention. The image forming apparatus 200 develops a latent electrostatic image with the toner produced by the production method described above to form a visible image, transfers the visible image to a sheet, which is one example of a recording medium, and fix the visible image on the sheet to form an image. Note that, in the present embodiment, an example where the image forming apparatus 200 is an electrophotographic printer is explained, but the image forming apparatus is not limited to the electrophotographic printer, and may be a photocopier, or a facsimile.

As illustrated in FIG. 10, the image forming apparatus 200 is equipped with a paper feeding element 210, a transporting element 220, an image forming element 230, a transferring element 240, and a fixing element 250.

As illustrated in FIG. 10, the paper feeding element 210 is equipped with a paper feeding cassette 211 in which sheets to be fed is stored, and a feeding roller 212 configured to feed sheets stored in the paper feeding cassette 211 one by one.

The transporting element 220 is equipped with a roller 221 configured to transport the sheet fed by the feeding roller 212 to the side of the transferring element 240, a pair of timing rollers 222 configured to send the sheet transported by the roller 221 to the transferring element 240 with the predetermined timing, and a paper ejecting roller 223 configured to eject the sheet on which the toner has been fixed by the fixing element 250 to a paper ejection tray 224.

The image forming element 230 is equipped with an image forming unit Y, which is configured to form an image using a developer containing a yellow toner (toner Y), an image forming unit C, which is configured to form an image using a developer containing a cyan toner (toner C), an image forming unit M, which is configured to form an image using a developer containing a magenta toner (toner M), an image forming unit K, which is configured to form an image using a developer containing a black toner (toner K), and an exposure 233, where the image forming unit Y, the image forming unit C, the image forming unit M, and the image forming unit K are aligned from left to right in FIG. 10 with a certain interval. Note that, the toners (Y, C, M, K) are each the toner produced by the aforementioned production method.

In FIG. 10, the four image forming units have substantially the same mechanical structures, provided that a developer for use is different. Each image forming unit contains: a photoconductor drum (231Y, 231C, 231M, 231K), which is clockwise (FIG. 10) rotatably provided and is configured to bear a latent electrostatic image and a toner image; a charger (232Y, 232C, 232M, 232K) configured to uniformly charge a surface of the photoconductor drum (231Y, 231C, 231M, 231K); a toner cartridge (237Y, 237C, 237M, 237K) configured to supply a toner of respective color (Y, C, M, K); a developing device (234Y, 234C, 234M, 234K) configured to develop a latent electrostatic image formed on the photoconductor drum (231Y, 231C, 231M, 231K) by an exposure device 233 with the toner supplied from the toner cartridge (237Y, 237C, 237M, 237K) to form a toner image; a diselectrification device (235Y, 235C, 235M, 235K) configured to diselectrify the surface of the photoconductor drum (231Y, 231C, 231M, 231K) after the toner image is primary transferred to a transfer medium; and a cleaner (236Y, 236C, 236M, 236K) configured to remove the residual toner remained on the surface of the photoconductor drum (231Y, 231C, 231M, 231K) after diselectrified by the diselectrification device (235Y, 235C, 235M, 235K).

The exposure device 233 is a device, in which laser light L emitted from a light source 233a based on the image information is reflected with a polygon mirror (233bY, 233bC, 233bM, 233bK), which is rotatably driven by a motor, to radiate the photoconductor drum (231Y, 231C, 231M, 231K). A latent electrostatic image based on the image information is formed on the photoconductor drum 231 by means of the exposure device 233.

The transferring element 240 contains: a driving roller 241 and a driven roller 242; an intermediate transfer belt 243, which is supported by these rollers, and is serving as a transfer member capable of rotating anticlockwise in FIG. 7 along with the rotation of the driving roller 241; a primary transfer roller (244Y, 244C, 244M, 244K) provided to face the photoconductor drum 231 via the intermediate transfer belt 243; and a secondary transfer roller 246 provided to face a secondary counter roller 245 via the intermediate transfer belt 243 at the transfer position of the toner image to a sheet.

In the transferring element 240, primary transfer bias is applied to the primary transfer roller 244 to transfer (primary transfer) each toner image formed on the surface of the photoconductor drum 231 onto the intermediate transfer belt 243. Moreover, secondary transfer bias is applied to the secondary transfer roller 246 to transfer (secondary transfer) the toner image on the intermediate transfer belt 243 to a transported sheet transported, which is nipped between the secondary transfer roller 246 the secondary counter roller 245.

The fixing element 250 contains: a heat roller 251 which contains a heater therein, and is configured to heat a sheet to temperature higher than the minimum fixing temperature of the toner; and a pressure roller 252, which is rotatably pressed against the heat roller 251 to form a contact surface (nip). In the present embodiment, the minimum fixing temperature is the lower limit of the temperature at which the toner can be fixed.

The image forming apparatus in accordance with the present embodiment uses a toner produced by the production method of the present embodiment, which has a sharp particle size distribution and excellent toner properties (e.g., charging property, environmental property, and storage stability), and therefore the image forming apparatus can form a high quality image.

Supplement to Embodiment

In each of the embodiments above, examples where the apparatus used for the method for producing particles is the apparatus for producing particles (1, 2, or 3) depicted in FIGS. 4 to 6 are explained, but not limited thereto.

In the embodiment above, an example where the melt containing the pressure plastic material and the compressive fluid is jetted into the air is explained, but the embodiment of the present invention is not limited thereto. For example, the melt can be jetted into the atmosphere that has higher pressure than the atmospheric pressure, but has lower pressure than the pressure inside the nozzle 32. In this case, control of particle diameters or particle size distribution can be enhanced by controlling the jet speed (outlet linear velocity). Moreover, a cooling effect to the melt jetted from the nozzle 32 due to the Joule-Thomson effect can be suppressed, and therefore heating by the heater 26 can be suppressed, which leads to energy saving and cost saving.

EXAMPLES

The present invention will be more specifically explained through Examples and Comparative Examples hereinafter, but Examples shall not be construed as to limit the scope of the present invention.

—Synthesis of Polyester Resin 1 (Pressure Plastic Material)—

A reaction vessel equipped with a cooling tube, a stirrer, and a nitrogen inlet tube was charged with 229 parts of a bisphenol A ethylene oxide (2 mol) adduct, 529 parts of a bisphenol A propylene oxide (3 mol) adduct, 208 parts, of terephthalic acid, 46 parts of adipic acid, and 2 parts of dibutyl tin oxide, and the mixture was allowed to react for 8 hours at 230° C. under the atmospheric pressure. The resultant was further allowed to react for 5 hours under the reduced pressure of 10 mmHg to 15 mmHg. Thereafter, 44 parts of trimellitic anhydride was added to the reaction vessel, and the resulting mixture was allowed to react for 2 hours at 180° C. under the atmospheric pressure to thereby yield Polyester Resin 1. Polyester Resin 1 had the number average molecular weight of 2,500, weight average molecular weight of 6,700, glass transition temperature (Tg) of 43° C., and acid value of 25 mgKOH/g.

—Polylactic Acid Resin—

A polylactic acid-based resin, VYLOECOL (registered trade mark) BE-400, manufactured by TOYOBO CO., LTD., was used.

—Synthesis of Polyester Resin 2 (Pressure Plastic Material)—

A reaction vessel equipped with a cooling tube, a stirrer, and a nitrogen inlet tube was charged with 283 parts by mass of sebacic acid, 215 parts by mass of 1,6-hexanediol, and 1 part by mass of titanium dihydroxybis(triethanol aminate) as a condensation catalyst, and the resulting mixture was allowed to react under a flow of nitrogen gas at 180° C. for 8 hours while removing the generated water. Next, the resultant was allowed to react under a flow of nitrogen gas for 4 hours while gradually heated to 220° C. as well as removing the generated water and 1,6-hexanediol, and then was further reacted under the reduced pressure of 5 mmHg to 20 mmHg until the weight average molecular weight (Mw) of a reaction product reached 17,000, to thereby obtain Polyester Resin 2 (crystalline polyester resin) having a melting point of 63° C.

—Synthesis of Polyurethane Resin 1 (Pressure Plastic Material)—

A reaction vessel equipped with a cooling tube, a stirrer, and a nitrogen inlet tube was charged with 283 parts by mass of sebacic acid, 215 parts by mass of 1,6-hexanediol, and 1 part by mass of titanium dihydroxybis(triethanol aminate) as a condensation catalyst, and the resulting mixture was allowed to react under a flow of nitrogen gas at 180° C. for 8 hours while removing the generated water. Next, the resultant was allowed to react under a flow of nitrogen gas for 4 hours while gradually heated to 220° C. as well as removing the generated water and 1,6-hexanediol, and then was further reacted under the reduced pressure of 5 mmHg to 20 mmHg until the weight average molecular weight (Mw) of a reaction product reached 6,000.

The thus obtained crystalline resin (249 parts by mass) was transferred into a reaction vessel equipped with a cooling tube, a stirrer, and a nitrogen inlet tube, and the reaction vessel was further charged with 250 parts by mass of ethyl acetate, and 9 parts by mass of hexamethylene diisocyanate (HDI). The resulting mixture was allowed to react under a flow of nitrogen gas at 80° C. for 5 hours. Subsequently, the ethyl acetate was removed under the reduced pressure, to thereby obtain Polyurethane Resin 1 (crystalline polyurethane resin) having the weight average molecular weight (Mw) of 20,000, and a melting point of 65° C.

Example 1

—Production of Toner—

In Example 1, a toner was produced by means of an apparatus for producing particles 1 illustrated in FIG. 4. In Example 1, a first compressive fluid was obtained by heating and compressing carbon dioxide stored in the bomb 11.

<Raw Materials>

| | |
|---|---|
| Polyester Resin 1 | 95 parts by mass |
| Colorant (copper phthalocyanine blue, C.I. Pigment Blue 15:3, manufactured by Dainichiseika Color and Chemicals Mfg. Co., Ltd.) | 5 parts by mass |
| Paraffin wax (melting point: 79° C.) | 5 parts by mass |

After mixing the toner raw materials above by a mixer, the mixture was melt-kneaded by a two-roll mill, and the kneaded product was rolled and cooled. A high pressure cell 14 of the apparatus for producing particles 1 illustrated in FIG. 4 was charged with the kneaded product, and carbon dioxide was introduced as a supercritical fluid to have 150° C. and 40 MPa, and the kneaded product and carbon dioxide were stirred for 1 hour. The obtained melt (toner melt) had viscosity of 18 mPa·s.

<Measurement of Viscosity of Melt>

As for the measurement of the viscosity of the melt, a vibration viscometer (XL7, manufactured by Hydramotion Ltd.) was used. A high pressure cell was charged with a sample and a compressive fluid (carbon dioxide), the measurement of the viscosity was performed at 150° C. and 40 MPa.

In this state, the valve 13b was open, and the pumps 12a and 12b were operated to jet the melt from the nozzle 32 having an opening diameter of 100 μm. As for the nozzle 32, a two-fluid nozzle illustrated in FIG. 7 was used. The jetted melt was formed into particles, followed by solidified, to thereby obtain Toner 1. During this process, the temperature and pressure inside the high pressure cell 14 were constantly maintained at 150° C. and 40 MPa, respectively, by adjusting the pump 12a and the back pressure valve 14a. Toner 1 had the volume average particle diameter (Dv) of 7.5 μm, the number average particle diameter (Dn) of 6.2 μm, and Dv/Dn of 1.21.

<Measurement of Volume Average Particle Diameter Dv, Number Average Particle Diameter Dn, and Ratio (Dv/Dn) of Toner>

The volume average particle diameter, and a ratio (volume average particle diameter/number average particle diameter) of the volume average particle diameter to the number average particle diameter were measured by means of a particle size analyzer, Coulter Counter TAII, manufactured by Bechman Electronics, Inc.

<Measurement of Maximum Feret Diameter of Pores>

The average maximum Feret diameter of the pores of the toner was determined in the following manner. A cross-section of the particles was observed under an electron microscope, and a cross-section photograph thereof was taken. The obtained cross-section photograph was processed using an image processing software (ImageJ) to binarize the image, to thereby identify the pores. Thirty pores were selected from the identified pores in the order of those having the larger maximum Feret diameter, and the average value thereof was determined as the average maximum Feret diameter of the pores.

Example 2

—Production of Toner—

In Example 2, a toner was produced by means of the apparatus for producing particles 2 illustrated in FIG. 5. In Example 2, a first compressive fluid was obtained by heating and compressing carbon dioxide stored in the bomb 11.

<Raw Materials>

| | |
|---|---|
| Polyester Resin 2 | 95 parts by mass |
| Colorant (copper phthalocyanine blue, C.I. Pigment Blue 15:3, manufactured by Dainichiseika Color and Chemicals Mfg. Co., Ltd.) | 5 parts by mass |
| Paraffin wax (melting point: 79° C.) | 5 parts by mass |

After mixing the toner raw materials above by a mixer, the mixture was melt-kneaded by a two-roll mill, and the kneaded product was rolled and cooled. A cell 24 of the apparatus for producing particles 2 illustrated in FIG. 5 was charged with the kneaded product, and the kneaded product was heated to 100° C. to be plasticized. The pump 12a was operated and the valve 13a was open so that carbon dioxide was introduced as a first compressive fluid to have 100° C. and 40 MPa. Moreover, the pump 12b was operated and the valve 13b was open so that the plasticized kneaded product and the first compressive fluid were mixed by the blending device 17. The melt obtained in the blending device 17 had the viscosity of 7 mPa·s. In this state, the valve 13c was open and the pumps 12a and 12b were operated to jet the melt from the nozzle 32 having an opening diameter of 100 μm. As for the nozzle 32, a two-fluid nozzle illustrated in FIG. 8 was used. The jetted melt was formed into particles, followed by solidified, to thereby obtain Toner 2.

Toner 2 was subjected to the measurements of the viscosity of the melt, volume average particle diameter (Dv), number average particle diameter (Dn), and Dv/Dn in the same manner as in Example 1. The results are presented in Table 1.

Example 3

—Production of Toner—

In Example 3, a toner was produced by means of an apparatus for producing particles 3 illustrated in FIG. 6. In Example 3, a carbonic acid gas (carbon dioxide) bomb was used as the bomb 11, and moreover a nitrogen bomb was used as the bomb 21.

<Raw Materials>

| | |
|---|---|
| Polyurethane Resin 1 | 95 parts by mass |
| Colorant (copper phthalocyanine blue, C.I. Pigment Blue 15:3, manufactured by Dainichiseika Color and Chemicals Mfg. Co., Ltd.) | 5 parts by mass |
| Paraffin wax (melting point: 79° C.) | 5 parts by mass |

After mixing the toner raw materials above by a mixer, the mixture was melt-kneaded by a two-roll mill, and the kneaded product was rolled and cooled. A cell 24 of the apparatus for producing particles 3 illustrated in FIG. 6 was charged with the kneaded product, and the kneaded product was heated to 100° C. to be plasticized. The pump 12a was operated and the valve 13a was open so that carbon dioxide was introduced as a first compressive fluid to have 100° C. and 60 MPa. Moreover, the pump 12b was operated and the valve 13b was open so that the plasticized kneaded product and the first compressive fluid were mixed by the blending device 17. Next, the valve 23 was open and the pump 22 and the heater 26 were used to jet supercritical nitrogen as a second compressive fluid from the nozzle 32, with maintaining the pressure and temperature at 60 MPa and 100° C. In this state, the valve 13c was open so that a melt obtained by bringing the kneaded product and the first compressive fluid into contact with each other was jetted from the nozzle 32 having an opening diameter of 100 μm while supplying the second compressive fluid to the melt. As for the nozzle 32, a three-fluid nozzle illustrated in FIG. 9 was used. The jetted melt was formed into particles, followed by solidified, to thereby obtain Toner 3.

Toner 3 was subjected to the measurements of the viscosity of the melt, volume average particle diameter (Dv), number average particle diameter (Dn), and Dv/Dn in the same manner as in Example 1. The results are presented in Table 1.

Comparative Example 1

—Production of Toner—

Comparative Toner 1 was obtained in the same manner as in Example 1, provided that the nozzle for use was changed from the two-fluid nozzle to a one-fluid nozzle.

Comparative Toner 1 was subjected to the measurements of the viscosity of the melt, volume average particle diameter (Dv), number average particle diameter (Dn), and Dv/Dn in the same manner as in Example 1. The results are presented in Table 1.

Comparative Example 2

—Production of Toner—

Comparative Toner 2 was obtained in the same manner as in Example 2, provided that the nozzle for use was changed from the two-fluid nozzle to a one-fluid nozzle.

Comparative Toner 2 was subjected to the measurements of the viscosity of the melt, volume average particle diameter (Dv), number average particle diameter (Dn), and Dv/Dn in the same manner as in Example 1. The results are presented in Table 1.

Example 4

—Production of Resin Particles—

In Example 4, resin particles were produced by means of an apparatus for producing particles 1 illustrated in FIG. 4. In Example 4, a first compressive fluid was obtained by heating and compressing carbon dioxide stored in the bomb 11.

A high pressure cell 14 of the apparatus for producing particles 1 illustrated in FIG. 4 was charged with Polylactic Acid Resin, and carbon dioxide was introduced as a supercritical fluid to have 150° C. and 60 MPa, and Polylactic Acid Resin and carbon dioxide were stirred for 1 hour. The obtained melt had viscosity of 80 mPa·s. In this state, the valve 13b was open, and the pumps 12a and 12b were operated to jet the melt from the nozzle 32 having an opening diameter of 200 μm. As for the nozzle 32, a two-fluid nozzle illustrated in FIG. 7 was used. The jetted melt was formed into particles, followed by solidified, to thereby obtain Resin Particles 1. During this process, the temperature and pressure inside the high pressure cell 14 were constantly maintained at 150° C. and 60 MPa, respectively, by adjusting the pump 12a and the back pressure valve 14a. Resin Particles 1 had the volume average particle diameter (Dv) of 15.0 μm, the number average particle diameter (Dn) of 6.1 μm, and Dv/Dn of 2.46. The results are presented in Table 2.

Note that, the viscosity of the melt, the volume average particle diameter (Dv), and the number average particle diameter were measured in the same manner as in Example 1.

Comparative Example 3

—Production of Resin Particles—

Comparative Resin Particles 1 were obtained in the same manner as in Example 4, provided that the two-fluid nozzle was replaced with a one-fluid nozzle. The viscosity of the melt, the volume average particle diameter (Dv), the number average particle diameter (Dn), and Dv/Dn were measured in the same manner as in Example 1. The results are presented in Table 2.

Particle Size Distribution

Dv/Dn was evaluated based on the following criteria.

[Evaluation Criteria]

A: 1.00 to 1.10
B: greater than 1.10 but 1.15 or less
C: greater than 1.15 but 1.25 or less
D: greater than 1.25

TABLE 1

| Particle No. | | Processing temperature (° C.) | Processing pressure (MPa) | Viscosity of melt (mPa · s) | Type of nozzle | Nozzle diameter (μm) |
|---|---|---|---|---|---|---|
| Ex. 1 | Toner 1 | 150 | 40 | 18 | two-fluid | 100 |
| Ex. 2 | Toner 2 | 100 | 40 | 7 | two-fluid | 100 |
| Ex. 3 | Toner 3 | 100 | 60 | 2 | three-fluid | 100 |
| Comp. Ex. 1 | Comparative Toner 1 | 150 | 40 | 18 | one-fluid | 100 |
| Comp. Ex. 2 | Comparative Toner 2 | 100 | 40 | 7 | one-fluid | 100 |

| Particle No. | | Dv (μm) | Dn (μm) | Dv/Dn | Particle size distribution | Maximum Feret diameter (nm) |
|---|---|---|---|---|---|---|
| Ex. 1 | Toner 1 | 7.5 | 6.2 | 1.21 | C | 400 |
| Ex. 2 | Toner 2 | 5.4 | 4.8 | 1.12 | B | 250 |
| Ex. 3 | Toner 3 | 4.9 | 4.5 | 1.09 | A | 180 |
| Comp. Ex. 1 | Comparative Toner 1 | 8.3 | 6.4 | 1.30 | D | 450 |
| Comp. Ex. 2 | Comparative Toner 2 | 5.8 | 4.6 | 1.26 | D | 290 |

TABLE 2

| Particle No. | | Processing temperature (° C.) | Processing pressure (MPa) | Viscosity of melt (mPa · s) | Type of nozzle | Nozzle diameter (μm) |
|---|---|---|---|---|---|---|
| Ex. 4 | Resin Particle 2 | 150 | 60 | 80 | two-fluid | 200 |
| Comp. Ex. 3 | Comparative Resin Particle 2 | 150 | 60 | 80 | one-fluid | 200 |

| Particle No. | | Dv (μm) | Dn (μm) | Dv/Dn | Particle size distribution | Maximum Feret diameter (nm) |
|---|---|---|---|---|---|---|
| Ex. 4 | Resin Particle 2 | 15.0 | 6.1 | 2.46 | — | 500 |
| Comp. Ex. 3 | Comparative Resin Particle 2 | 18.1 | 6.3 | 2.87 | — | 580 |

Note that, the toners of Examples 1 to 3 and Comparative Examples 1 to 2, and the resin particles of Example 4 and Comparative Example 3 were subjected to the measurement of an amount of a residual organic solvent, and the results thereof were all equal to or less than the detection limit.

<Measuring Method of Residual Solvent>

The amount of the residual solvent of the particles was measured in the following measurement method. To 1 part by mass of particles to be measured, 2 parts by mass of 2-propanol was added, and dispersed by ultrasonic wave for 30 minutes, and then the mixture was stored in a refrigerator at 5° C. for 1 day or longer, to thereby extract a solvent in the particles. A supernatant liquid was analyzed by gas chromatography (GC-14A, manufactured by Shimadzu Corporation), to determine the amount of the solvent and a residual monomer in the particles. Thus, the concentration of the solvent was measured. The measurement conditions for such analysis were as follows.

Device: Shimadzu GC-14A
Column: CBP20-M 50-0.25
Detector: FID
Injection volume: 1 μL to 5 μL
Carrier gas: He 2.5 kg/cm$^2$
Flow rate of hydrogen: 0.6 kg/cm$^2$
Flow rate of air: 0.5 kg/cm$^2$
Chart speed: 5 mm/min
Sensitivity: Range 101×Atten 20
Column temperature: 40° C.
Injection temperature: 150° C.

To each of Toners 1 to 3 and Comparative Toners 1 and 2 (100 parts by mass), 0.7 parts by mass of hydrophobic silica and 0.3 parts by mass of hydrophobic titanium oxide were added, and the mixture was mixed for 5 minutes by means of HENSCHEL MIXER at a rim speed of 8 m/s. The resulting powder was passed through a mesh having an opening size of 100 μm, to remove coarse particles.

Next, 5% by mass of the resulting toner, which had been subjected the external additive treatment in the aforementioned manner, and 95% by mass of a copper-zinc ferrite carrier, which had been coated with a silicone resin, and had the average particle diameter of 40 μm, were homogeneously mixed and charged by means of a turbula mixer in which a vessel was rolled for stirring, to thereby prepare a two-component developer, Developers 1 to 3 and Comparative Developers 1 and 2, respectively. Note that, the toners used for Developers 1 to 3 and Comparative Developers 1 and 2 were respectively Toners 1 to 3 and Comparative Toners 1 and 2.

Note that, Resin Particles 1 of Example 4 and Comparative Resin Particles 1 of Comparative Example 3 were not subjected to the following image evaluation.

Moreover, to 100 parts by mass of each of Toners 1 to 3 and Comparative Toners 1 and 2, 0.7 parts by mass of hydrophobic silica, and 0.3 parts of hydrophobic titanium oxide were added, and the mixture was mixed for 5 minutes by means of HENSCHEL MIXER at a rim speed of 8 m/s, to thereby prepare a one-component developer, Developers 11 to 13 and Comparative Developers 11 and 12, respectively. Note that, the toners used for Developers 11 to 13 and Comparative Developers 11 and 12 were respectively Toners 1 to 3 and Comparative Toners 1 and 2.

Each of the obtained developer was set in an image forming apparatus (IPSIO Color 8100 manufactured by Ricoh Company Limited for the evaluation of a two-component developer, and IMAGIO Neo C200 manufactured by Ricoh Company Limited for the evaluation for a one-component developer), and an image was output to evaluate in the following manner. The results are presented in Table 3.

<Image Density>

A solid image was output on plain paper, which was a transfer sheet (Type 6200, manufactured by Ricoh Company Limited), with the low toner deposition amount of 0.3 mg/cm$^2$±0.1 mg/cm$^2$. Then, the image density of the image was measured by a densitometer X-Rite (manufactured by X-Rite). The results were evaluated based on the following criteria.

[Evaluation Criteria]
A: Image density was 1.4 or more.
B: Image density was 1.35 or more but less than 1.4.
C: Image density was 1.3 or more but less than 1.35.
D: Image density was less than 1.3.

<Toner Scattering>

After 100,000 sheets of a chart having an image area of 5% were continuously output using each of the developer in an image forming apparatus (IPSIO Color 8100, manufactured by Ricoh Company Limited), which had been converted to oilless fixing system and tuned for evaluation, at a temperature of 40° C. and 90% RH, the level of toner contamination in the image forming apparatus was visually observed and evaluated based on the following evaluation criteria.

[Evaluation Criteria]
A: No toner contamination was observed at all in the image forming apparatus, and an excellent state was maintained.
B: Slight toner contamination was observed in the image forming apparatus, but it was not a problematic.
C: Toner contamination was observed in the image forming apparatus.
D: Severe toner contamination was observed in the image forming apparatus, and it was problematic and out of an acceptable level.

<Transfer Property>

After a chart having an image area of 20% was transferred from the photoconductor to paper, a residual toner on the photoconductor was transferred onto white paper using SCOTCH TAPE (manufactured by Sumitomo 3M Ltd.) just before cleaning. The density of the white paper on which the residual toner had been transferred was then measured using Macbeth Reflection Densitometer RD514. The results were evaluated based on the following criteria.

[Evaluation Criteria]
A: The difference with blank white paper was less than 0.005.
B: The difference with blank white paper was 0.005 to 0.010.
C: The difference with blank white paper was 0.011 to 0.02.
D: The difference with blank white paper was more than 0.02.

<Charge Stability>

A letter image pattern having an image area of 12% was continuously output on 100,000 sheets using each of the developers. The variation in the charge amount during the output test was evaluated. A small amount of the developer was collected from the sleeve, and the variation of the charge amount was determined by a blow-off method. The results are evaluated based on the following criteria.

[Evaluation Criteria]
B: The variation in the charge amount was less than 5 μc/g.

C: The variation in the charge amount was 5 μc/g to 10 μc/g.

D: The variation in the charge amount was more than 10 μc/g.

<Filming>

After 1,000 sheets of respective band charts having image areas of 100%, 75% and 50% were output, the filming over a developing roller and photoconductor were visually observed and evaluated based on the following evaluation criteria.

[Evaluation Criteria]

A: No filming occurred.
B: Filming slightly occurred.
C: Streaky filming occurred.
D: Filming occurred all over the developing roller and photoconductor.

<Cleaning Property>

After outputting 1,000 sheets of a chart having an image area of 95%, cleaning was performed on a photoconductor. A residual toner on the cleaned photoconductor was transferred onto white paper using SCOTCH TAPE (manufactured by Sumitomo 3M Limited). The density of the white paper on which the residual toner had been transferred was measured by means of Macbeth reflection densitometer RD514. The results were evaluated based on the following criteria.

[Evaluation Criteria]

A: The difference with blank white paper was less than 0.005.
B: The difference with blank white paper was 0.005 to 0.010.
C: The difference with blank white paper was 0.011 to 0.02.
D: The difference with blank white paper was more than 0.02.

<Total Evaluation>

The evaluation results of the evaluation items were determined with the following points:

A: 1 point
B: 0 points
C: −1 points
D: −2 points

The total evaluation was performed based on the total points.

[Evaluation Criteria]

A: The total points were 4 points to 5 points.
B: The total points were 0 points to 3 points.
C: The total points were −3 points to −1 points.
D: The total points were lower than −4.

As described above, it was found that the present invention could produce particles, which prevented clogging as the compressive fluid and the melt were mixed inside the nozzle to form fine particles, and had small particle diameters with a narrow particle size distribution.

Aspects of the present invention are, for example, as follows:

<1> A method for producing particles, containing:
bringing a compressive fluid and a pressure plastic material into contact with each other to melt the pressure plastic material; and
jetting a melt obtained by melting the pressure plastic material to form particles,
wherein the jetting the melt is performed by a two-fluid nozzle or three-fluid nozzle.

<2> The method according to <1>, wherein the pressure plastic material is a resin having at least a carbonyl structure.

<3> The method according to <1> or <2>, wherein a viscosity of the melt is 20 mPa·s or lower at temperature and pressure as the melt is jetted.

<4> The method according to any one of <1> to <3>, wherein the jetting is jetting the melt while supplying a compressive fluid to the melt.

<5> The method according to any one of <1> to <4>, wherein the bringing is continuously bringing the compressive fluid and the pressure plastic material into contact with each other, and the jetting is continuously jetting the melt to continuously form particles.

<6> The method according to <5>, wherein the bringing is continuously bringing the compressive fluid and the pressure plastic material into contact with each other without using a static mixer.

<7> The method according to any one of <1> to <6>, wherein the compressive fluid contains carbon dioxide.

<8> The method according to any one of <1> to <7>, wherein the bringing is bringing the compressive fluid and the pressure plastic material, which has been heated and plasticized, into contact with each other.

<9> Particles, containing:
substantially no organic solvent,
wherein the particles are particles obtained by the method according to any one of <1> to <8>.

<10> Particles, containing:
a pressure plastic material,
wherein the particles have pores, and an average maximum Feret diameter of the pores is 10 nm or greater but smaller than 500 nm.

TABLE 2

| | Image density | Toner scattering | Transfer property | Charge stability | Filming | Cleaning property | Total evaluation |
|---|---|---|---|---|---|---|---|
| Developer 1 | B | B | B | B | A | B | B |
| Developer 2 | A | A | A | B | A | B | A |
| Developer 3 | A | A | A | B | A | A | A |
| Comparative Developer 1 | B | B | C | B | B | B | C |
| Comparative Developer 2 | B | B | C | B | B | B | C |
| Developer 11 | B | B | B | B | B | B | B |
| Developer 12 | A | A | A | B | A | B | A |
| Developer 13 | A | A | A | B | A | A | A |
| Comparative Developer 11 | B | B | C | B | B | B | C |
| Comparative Developer 12 | B | B | C | B | B | B | C |

REFERENCE SIGNS LIST

1: Apparatus for producing particles
2: Apparatus for producing particles
11, 21: Bomb
12a, 12b, 22: Pump
13a, 13b, 23: Valve
14: High pressure cell
16, 26: Heater
24: Cell
17, 31: Blending device
32: Nozzle
200: Image forming apparatus
210: Paper feeding element
211: Paper feeding cassette
212: Feeding roller
220: Transporting element
221: Roller
222: Timing roller
223: Paper ejecting roller
224: Ejection tray
230: Image forming element
231: Photoconductor drum (one example of the latent electrostatic image bearing member)
232: Charger
233: Exposure device (one example of the latent electrostatic image forming unit)
234: Developing device (one example of the developing unit)
235: Diselectrification device
236: Cleaner
237: Toner cartridge
240: Transferring element (one example of the transferring unit)
241: Driving roller
242: Driven roller
243: Intermediate transfer belt
244: Primary transfer roller
245: Secondary counter roller
246: Secondary transfer roller
250: Fixing element (one example of the fixing unit)
251: Heat roller
252: Pressure roller
T: Toner

The invention claimed is:

1. A method for producing particles, comprising:
   contacting a first compressive fluid with a pressure plastic material, thereby producing a melt; and
   jetting the melt, thereby forming particles,
   wherein the jetting is performed with a three-fluid nozzle in which a third-fluid nozzle supplies a second compressive fluid to an outer circumference of a two-fluid nozzle that supplies the first compressive fluid and the melt, and
   wherein the first compressive fluid comprises carbon dioxide in a super critical state, and the second compressive fluid comprises nitrogen in a super critical state.

2. The method according to claim 1, wherein the pressure plastic material is a resin comprising a carbonyl structure.

3. The method according to claim 1, wherein a viscosity of the melt is 20 mPa·s or lower at a temperature and pressure while jetting.

4. The method according to claim 1, wherein both the contacting and jetting are continuous thereby continuously forming particles.

5. The method according to claim 4, wherein the contacting is continuous and does not comprise the use of a static mixer.

6. The method according to claim 1, wherein the first compressive fluid comprises carbon dioxide.

7. The method according to claim 1, wherein contacting the compressive fluid and the pressure plastic material further comprises heating and plasticizing the pressure plastic material prior to contacting with the fluid.

8. Particles, comprising:
   substantially no organic solvent,
   wherein the particles are obtained by
   contacting a first compressive fluid and a pressure plastic material with each other thereby producing a melt, and
   jetting the melt to form the particles,
   wherein the jetting is performed with a three-fluid nozzle in which a third-fluid nozzle supplies a second compressive fluid to an outer circumference of a two-fluid nozzle that supplies the first compressive fluid and the melt, and
   wherein the first compressive fluid comprises carbon dioxide in a super critical state, and the second compressive fluid comprises nitrogen in a super critical state.

9. The particles according to claim 8, wherein a ratio of a volume average particle diameter (Dv) to a number average particle diameter (Dn) of the particles, Dv/Dn, is from 1.0 to 1.10.

10. The method according to claim 1, wherein a ratio of a volume average particle diameter (Dv) to a number average particle diameter (Dn) of the particles, Dv/Dn, is from 1.0 to 1.10.

* * * * *